United States Patent
Figarella et al.

[19]

[11] Patent Number: 6,098,887
[45] Date of Patent: Aug. 8, 2000

[54] OPTICAL FOCUSING DEVICE AND METHOD

[75] Inventors: Luis A Figarella, Nashua, N.H.; David A. Imrie, Woburn; Harry McKinley, Southampton, both of Mass.; Howard Stern, Greenlawn, N.Y.; Jon E. Van Tassell, Winthrop, Mass.

[73] Assignee: Robotic Vision Systems, Inc., Canton, Mass.

[21] Appl. No.: 09/152,229

[22] Filed: Sep. 11, 1998

[51] Int. Cl.[7] .................................................. B06N 07/10
[52] U.S. Cl. .................. 235/472.01; 235/462.22
[58] Field of Search .................. 235/462.01, 462.22, 235/462.11, 462.09, 462.1, 462.23, 462.24, 462.25, 462.32, 462.36, 462.35, 462.41, 472.01

[56] References Cited

U.S. PATENT DOCUMENTS

| | | | |
|---|---|---|---|
| 4,136,821 | 1/1979 | Sugiura et al. | 235/462 |
| 4,282,425 | 8/1981 | Chadima et al. | 235/462 |
| 4,535,060 | 8/1985 | Sakai et al. | 235/472 |
| 4,578,571 | 3/1986 | Williams | 235/472 |
| 4,603,262 | 7/1986 | Eastman et al. | 235/472 |
| 4,650,292 | 3/1987 | Baker et al. | 350/432 |
| 4,710,615 | 12/1987 | Meyers | 235/454 |
| 4,734,566 | 3/1988 | Senda et al. | 235/454 |
| 4,782,219 | 11/1988 | Crater | 235/462 |
| 4,818,886 | 4/1989 | Drucker | 250/566 |
| 4,843,222 | 6/1989 | Hochgraf | 235/472 |
| 4,877,949 | 10/1989 | Danielson et al. | 235/462 |
| 4,920,255 | 4/1990 | Gabeler | 235/454 |
| 4,963,756 | 10/1990 | Quan et al. | 235/462 |
| 5,140,141 | 8/1992 | Ingaki et al. | 235/462 |
| 5,173,603 | 12/1992 | Lindacher | 250/236 |
| 5,175,421 | 12/1992 | Harris | 235/467 |
| 5,248,871 | 9/1993 | Takenaka | 235/462 |
| 5,347,121 | 9/1994 | Rudeen | 250/235 |
| 5,387,786 | 2/1995 | Peng | 235/462 |
| 5,426,288 | 6/1995 | Obata et al. | 235/462 |
| 5,438,187 | 8/1995 | Reddersen et al. | 235/462 |
| 5,479,011 | 12/1995 | Rudeen et al. | 250/235 |
| 5,565,668 | 10/1996 | Reddersen et al. | 235/462 |
| 5,585,616 | 12/1996 | Roxby et al. | 235/472 |
| 5,641,958 | 6/1997 | Rudeen | 250/235 |

*Primary Examiner*—Thien M. Le

[57] ABSTRACT

A hand held, omnidirectional symbology or bar code reader for imaging linear and two dimensional (matrix, maxi-code) bar codes over relatively long working distances. The reader includes an imaging system including a focusing objective taking lens and a two-dimensional photodetector that operate to form an image of a bar code in X and Y directions simultaneously and generate an electrical signal representative of the code for subsequent downstream processing which extracts information embedded in a bar code. Focusing is achieved via a rotating disk that carries a plurality of optical shims for different focus zones. A through-the-lens (TTL) targeting system is provided to visually assist the user in positioning the reader for a variety of code modalities to assure that a bar code will be captured within the field of view and be sharply imaged on the photodetector when the lens is focused. Two different forms of artificial illumination are provided to accommodate nearby codes that may be either specular or partially diffuse and more distant codes where the reflection characteristics have less impact on code contrast. Elements of the photodetector are used to assess available light levels and activate the artificial illumination system when ambient light levels are low. Ranging through the lens using elements of the photodetector is included to provide information to set the focus of the objective lens in one of many possible focusing zones. All of the reader's components are housed in an ergonomically designed shell to reduce user repetitive stress injuries while providing access to a user interface and a protective cover for the reader's various systems.

23 Claims, 20 Drawing Sheets

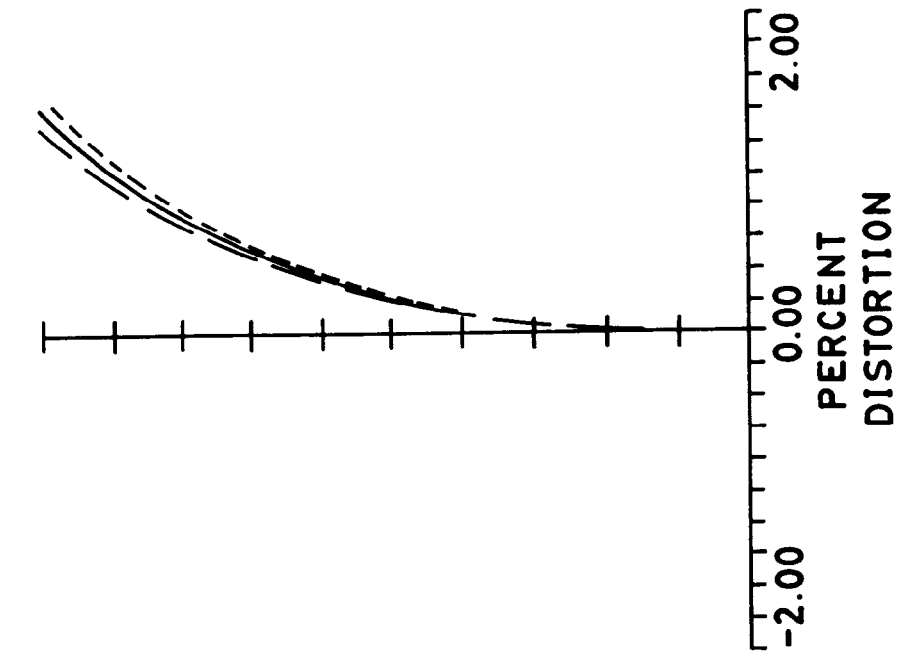
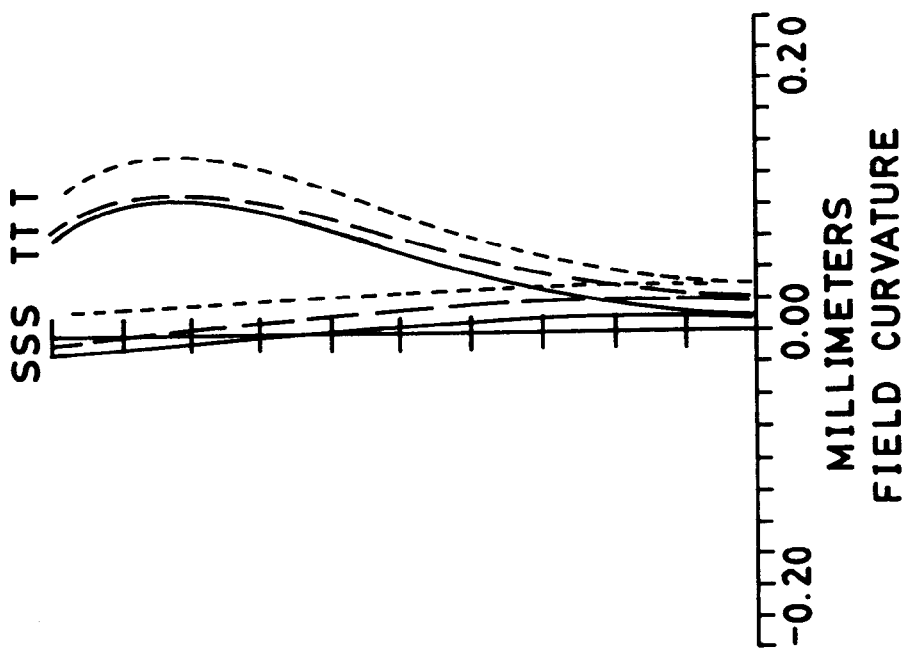

OPTICAL FOCUSING DEVICE AND METHOD

CROSS REFERENCE TO RELATED APPLICATIONS

This application is related to the copending application of Howard Stern for Diffuse Surface Illumination Apparatus And Methods, Attorney Docket No. RVCI-001, filed of even date; and the copending application of John H. Dowling, et al. for, Symbology Imaging and Reading Apparatus and Method, Attorney Docket No. RVCI-002, filed of even date; the entire disclosures of which are specifically incorporated herein by reference.

BACKGROUND OF THE INVENTION

Bar code technology has been used for almost thirty years in a variety of industrial and retail applications to rapidly provide machine readable information about products and processes involving those products. This technology has enjoyed its success because bar coding removes human error from data acquisition and entry processes as well as being repeatable and fast.

By convention, bar codes are systematic markings that modulate surface area in predetermined ways which encode information. Early bar codes consisted of a series of bars and spaces printed or otherwise affixed to a surface. Here, information was encoded in linear fashion as an alternating series of light and dark line pairs of predetermined sizes and sequences which represented agreed upon alphabets that translated directly into human understandable form with suitable decoding means.

While bar codes may vary in their use of formal encoding/decoding schemes, all characteristically share some common properties. For example, the density or amount of information that can be represented over a given surface area depends on the ability to form and read some minimum sized mark by which information may be transferred from code to reader. The size of such a mark is obviously limited by the means by which it can be formed and the ability of the reader to "see" or resolve it; the smaller the mark the higher the density and vice-versa. In earlier "linear" or 1D bar codes (actually two-dimensional structures), information was encoded along only one dimension where density depended on the width of the thinnest light-dark line pair. In emerging more elaborate 2D, or matrix codes, information is also encoded by the smallest segment used to modulate a surface area, but now along two directions.

Linear bar codes are typically "read" with laser scanners that project a narrow beam of light that is swept across the code being modulated thereby in accordance with the variations in the codes particular pattern. The modulated light reflected or transmitted (transmission code) by the code is detected, and the information carried in the modulated return beam is extracted via suitable decoding software resident in a general purpose computer of dedicated microprocessor. Laser scanning type readers are known to exist in both hand held and stationary forms.

Common hand held scanning devices include wands that directly contact the code, lasers for distant scanning, and two-dimensional photodetector arrays such as CCDs or CMOS arrays.

Wands operate by projecting a small beam of radiation onto the bar code. The diameter of the beam is made small enough to be modulated by the code and sampled fast enough to generate an electrical signal from which the required information can be easily extracted. Wands are limited in application to situations where direct contact is possible and are therefore not suitable for any applications requiring finite working distances.

Hand held laser scanners are suitable where large working distances are important because the lasers used can be focused to appropriately sized interrogation spots at long distances. Typically, a laser diode is used to project a beam of radiation that is focused and scanned over a bar code area by reflecting the beam from an oscillating mirror or rotating polygon mirror. The return beam is collected by suitable optics and directed to a photodetector to generate an electrical signal for subsequent downstream processing.

Stationary laser systems are also in widespread use for a variety of non-contact applications and are widely available at cash registers in supermarkets and the like so are now commonly known even to retail customers.

Two-dimensional array based systems operate by imaging a bar code onto a CCD or CMOS array which then generates an analog signal, typically at video rates, that represents the variation in intensity of the image. The intensity variation is typically converted into digital signal form and information is extracted via look-up (LUT) tables or the like.

Common to all of the reading modalities for bar codes are the need to be able to resolve details at the level at which information is encoded (high vs. low density), the ability to read over the required working distance for a particular application (near or distant codes), and the ability to operate under available lighting conditions or to provide suitable artificial illumination so that adequate signal to noise ratios are possible (detector sensitivity and lens speed). Obviously, these requirements are related and vary with the demands imposed by a particular application and the economics of the available solutions. Approaches to the problems associated with bar code readers have appeared in the patent literature and reflect considerations related to resolving power, working distance, targeting or aiming and framing, illumination delivery, as well as others.

For example, resolving power in laser scanning systems is related to the size of the minimum waist of a laser beam, assuming a Gaussian energy profile. For maximum power, the waist needs to be smallest to read high density bar codes. Also, it is know to provide focusing optics with laser scanners to increase working distance or provide a series of working distance zones within which bar codes can be read. For example, U.S. Pat. No. 4,920,255 issued on Apr. 24, 1990 to Stephen C. Gabeler and entitled AUTOMATIC INCREMENTAL FOCUSING SCANNER SYSTEM, discloses a stationary scanning system that includes a ranging means for determining bar code position and automatically adjusting the axial separation between various elements of a lens assembly to set an appropriate focal length to control spot size.

Other patents for laser scanning systems, such as for example, U.S. Pat. Nos. 5,641,958 and 5,347,121, both to Rudeen, and U.S. Pat. No. 5,479,011 to Rudeen, et al., advocate various means for selectively adjusting the size of the aperture stop of the optics used in conjunction with the laser beam to selectively provide different working distances in accordance with different depths of field that vary with aperture stop size.

U.S. Pat. No. 5,175,421 to Richard H. Harris describes a scanning system in which spot size is controlled through the use of an asymmetric rotating mirror system that changes the optical path length over which the laser travels to a bar code.

U.S. Pat. No. 5,140,141 describes a fixed scanning laser system in which beam direction and focus are controlled via a rotating holographic disk in conjunction with a stationary polygon mirror.

Mutli-focal length lenses have been proposed to focus lasers at different working distances as, for example, those shown in U.S. Pat. Nos. 5,438,187 and 5,565,668, both to Brad R. Redderson, et al.

In U.S. Pat. No. 5,173,603 issued to Joseph M. Lindacher a scanning laser system is described in which a rotating polygon is used in conjunction with a rotating spinner that carries a plurality of spherical mirror segments to focus the laser at different working distances.

U.S. Pat. No. 5,387,786 shows a focusing CCD based bar code reader in which the negative element of a traditional plus, minus, plus form of zooming system is displaced along the optical axis to focus in accordance with distance measurements provided via ranging system.

As described in U.S. Pat. No. 4,710,615 issued to Thomas J. Meyers, CCD's and light emitting diodes are placed along a rotating disc member at various locations to provide two-dimensional reading capability.

In U.S. Pat. No. 4,782,219 issued to David J. Crater, a system and method is disclosed by which a bar code is illuminated by dispersing a laser beam with diffusing material placed between the source and detector to enhance the readability of information embedded in bar codes by filling the relatively larger aperture of the detector with diffuse illumination that would otherwise not contribute to useable signal.

A diffuse illumination system is described in U.S. Pat. No. 5,585,616 issued to Donald L. Roxby, et al. Here, light sources are used behind the diffuser to create illumination used in a fixed CCD imaging based system to enhance the readability of specularly reflecting surfaces on which bar codes have been applied.

Commercially available hand held fixed focus CCD based imaging type bar code readers have been marketed, but are limited in use to fixed working distances.

While many approaches have been used to solve bar code problems related to resolving power, working distance and the provision of adequate signal levels, there still remains a need for reader modalities that offer the convenience of hand held operation and appreciable working distance for use in decoding not only the well-entrenched linear bar code but the emerging matrix or 2D forms as well.

Accordingly, it is a primary object of the present invention to provide a hand held bar code reader that is capable of reading both high- and low-density linear and 2D bar codes over an appreciable working distance.

It is another object of the present invention to provide a focusing objective lens system for use in resolving 2D and linear bar codes over a working distance that at least in part overlaps.

It is still object of the present invention to provide a hand held bar code reader for reading linear and 2D bar codes in low ambient lighting conditions.

It is yet object of the present invention to provide a hand held bar code reader that has omnidirectional reading capability.

It is another object of the present invention to provide an omnidirectional hand held bar code reader having an optical system that may be tilted through an appreciable predetermined angle with respect to normal incidence and still be able to resolve 2D and linear bar codes.

Still another object of the present invention is to provide a hand held bar code reader having a through the lens (TTL) targeting system by which the reader and its angular field of view with respect to a bar code may be set to assure that the bar code is within the viewable area and working distance of the reader.

Other objects of the invention will, in part, appear hereinafter and will, in part, be obvious when the following detailed description is read in connection with the accompanying drawings.

SUMMARY OF THE INVENTION

A hand held, omnidirectional symbology or bar code reader for imaging high- and low-density linear and two dimensional (e.g., matrix) bar codes over a relatively wide range of working distances. The reader includes an imaging system including a focusing objective taking lens and a two-dimensional photodetector that operate to form an image of a bar code in X and Y directions simultaneously and generate an electrical signal representative of the code for subsequent downstream processing to extract the information embedded in the code. Focusing is achieved via a rotating disc that carries optical shims or other light-controlling elements to change the optical path length or other characteristics through the objective to the photodetector, preferably a CCD or CMOS device. Good results can be realized using an objective taking lens having a nominal effective focal length of 14.00 mm with an F/# of 5.6. A through-the-lens (TTL) targeting system is provided to visually assist the user to correctly position the reader for a variety of code modalities to assure that the code will be captured within the imaging system field of view and otherwise be sharply imaged on the photodetector when the lens is focused. Two different forms of artificial illumination are provided; one to accommodate nearby codes that may be either specular or partially diffuse surfaces and another for more distant codes where the reflection characteristics and structure in the illumination have less impact on code contrast. Elements of the photodetector are used to assess available light levels and activate the artificial illumination system when ambient light levels are low. Ranging through the lens is achieved by using elements of the photodetector and assessing high frequency content in a portion of the images formed as the imaging system is cycled through its various focus zone configurations at a suitable speed, for example, approximately 600 RPM. A signal is provided to set the focus of the objective in one of many possible focusing zones in conjunction with information provided by a disk position encoder. All of the reader's components are housed in an ergonomically designed shell that is shaped to reduce user repetitive stress injuries while providing access to a user interface and a protective cover for the reader's various systems.

BRIEF DESCRIPTION OF THE DRAWINGS

The structure and operation of the invention, together with other objects and advantages thereof, may best be understood by reading the detailed description to follow in connection with the drawings in which unique reference numerals have been used throughout for each part and wherein:

FIG. 18A is a graph, similar to that of FIG. 17A showing the variation in saggital and tangential field curvature with field position when operating in the farthest focus zone (furthest working distance);

FIG. 18B is a graph, similar to that of FIG. 17B showing the variation in saggital and tangential distortion with field position when operating in the farthest focus zone (furthest working distance);

BRIEF DESCRIPTION OF TABLES

Table I provides the complete lens prescription for the imaging system of the invention in a standard output file format from a commercially available optical design program and may be used for purposes of facilitating construction;

Table II is a listing of the various focus zones of the invention showing the starting and ending zone positions for example focusing disk thicknesses superimposed on the rotating focusing disk base thickness; and Table III gives the relationship between symbology pel size and corresponding reader working distance for a possible photodetector which may be used in practicing the invention.

DETAILED DESCRIPTION

The present invention relates to an imaging and related system for use in an omnidirectional, focusing, hand held reader by which linear (1D) and matrix type symbologies or "bar codes" may be targeted, illuminated, and/or imaged via a two-dimensional photodetector array to provide an electrical signal in analog and/or digital form for subsequent downstream signal processing by which information encoded in the symbology may be extracted and converted to human readable form. Applications for the inventive hand held reader exist in retail point-of-sale environments as well as in industrial applications where portability, variable lighting conditions, flexibility in use with different symbology modalities, and a relatively large range of working distances are important considerations.

Figure 1:
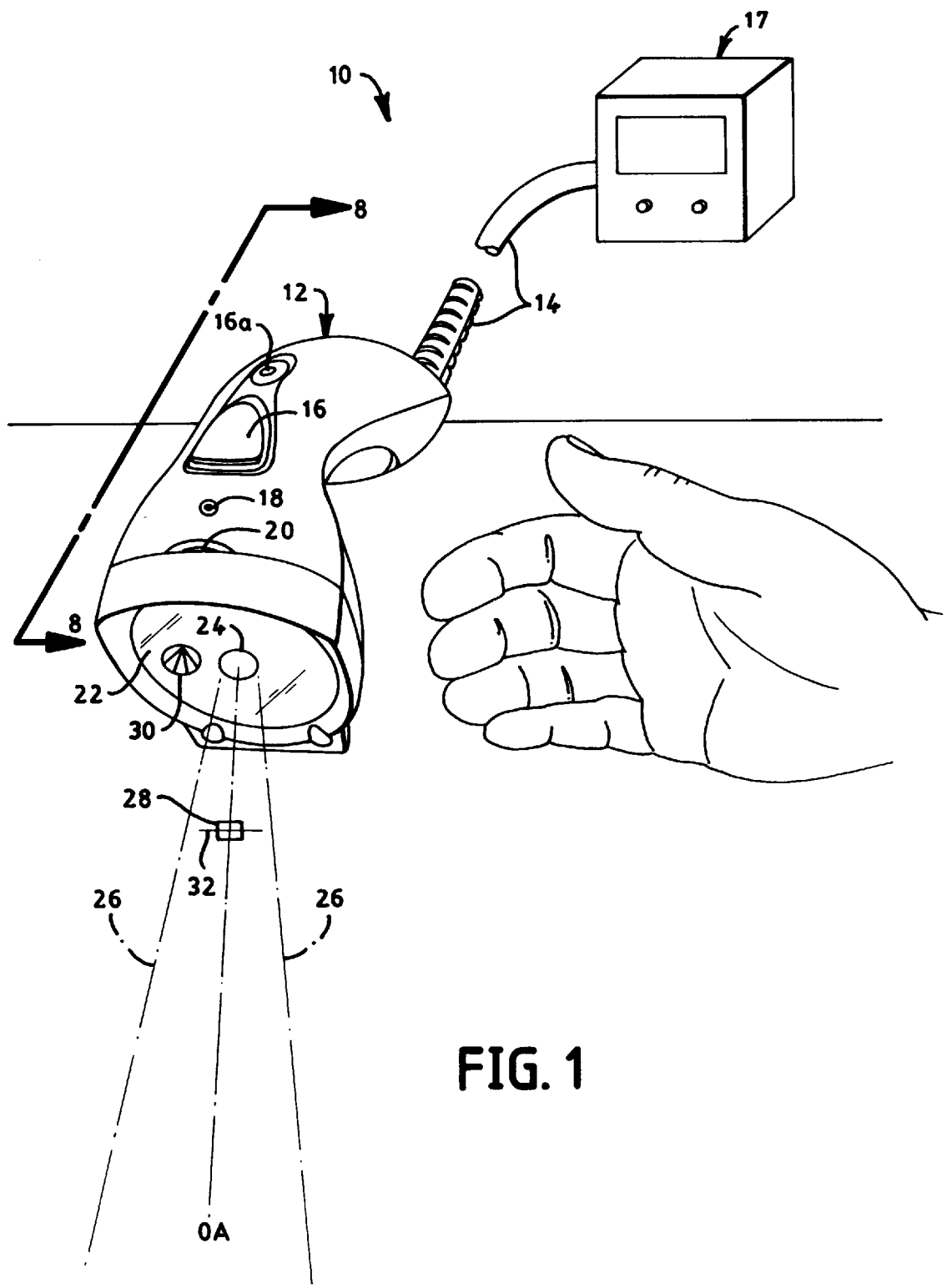
FIG. 1 is a diagrammatic perspective view of one embodiment of a hand held symbology imager of the invention shown imaging a nearby matrix, or 2D, type symbology and illustrating, among other things, the reader's field of view, targeting features, and one form of illumination it provides for lighting nearby symbologies.
Figure 2:
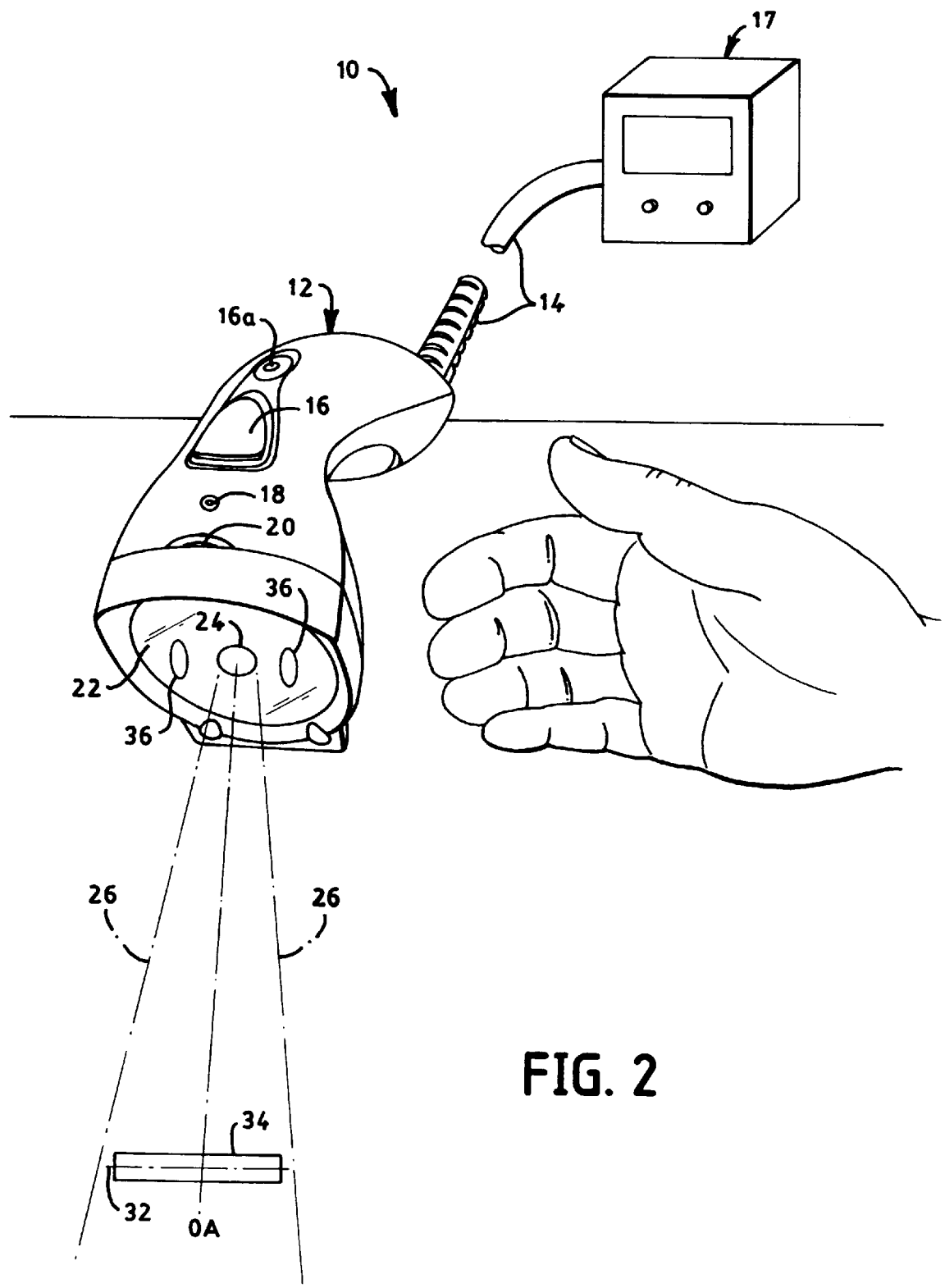
FIG. 2 is a diagrammatic perspective view of the embodiment of the hand held symbology imager of FIG. 1 shown imaging a relatively distant linear, or 1D, type symbology and illustrating, again among other things, the reader's field of view, targeting features, and another form of illumination provided for lighting relatively distant symbologies.

Referring now to FIGS. 1 and 2, there is shown generally at 10 a hand held bar code reader in accordance with the invention. Here, reader 10 is seen to comprise an ergonomic housing 12 whose shape has been designed to reduce user repetitive stress injuries while providing an easily accessible user interface that can be comfortably manipulated with one hand. An ergonomically featured housing suited for housing elements of the subject hand held bar code reader is described and claimed in the copending application of M. L. Evers, et al., for Multi-Modally Grippable Device and Method of Use, Attorney Docket No. 8355, filed of even date.

As shown in FIGS. 1 and 2, reader 10 is connected via a cable 14 to a dedicated microprocessor or computer 17 that houses various system components and software for analyzing electrical imaging signals provided by reader 10 and performing other system housekeeping tasks as, for example, exchanging signals related to ranging, power management, ambient light level, focusing, and activation of user interface signals. Components in housing 12 may also share one or more of such functions with microprocessor 17. If desired, reader 10 can be operated without being physically connected with associated apparatus, i.e., without need for cable 14. This can be accomplished by incorporating a radio frequency (RF) module (not shown) into reader 10 for communication with a portable terminal (not shown). A suitable module includes a radio frequency communication transceiver means to allow the reader 10 to transmit and receive information, (including but not limited to decoded data, configuration commands and images) to or from another computer or network. The reader 10 can contain energy storage means (e.g., batteries) with which to power it for a suitable duration independently of external sources. While batteries and RF will usually be connected, the utilization of RF only, without batteries, is permissible as a means of reducing the need for cable connections. An alternate to an RF communication module is an on-board infrared (IR) communication module that operates via an IR link between reader 10 and an external transceiving device (not shown).

Protruding through the top of housing 12 is a two position switch button 16 (or 16a) that is actuated manually by the user's thumb or index finger, depending on the manner of holding (gripping) reader 10. Also, provided are a visual light signal 18 that is operative to inform the user that the system has been turned on and is active and a visual light signal 20 that is operative to indicate that a bar code has been successfully decoded. Visual light signals 18 and 20 may be provided in a variety of suitable forms including strobe lights. Audible signals, or combinations of visual and audio signals, can also be employed for the foregoing purposes.

As used herein, the term "hand held" refers to the capability of reader 10 to be holdable or grippable by the user for the addressing and reading of a variety of symbologies. It will be appreciated, however, that reader 10 can be placed into a fixed or stationary position for the reading of symbologies within the field of view of the reader. For this purpose, an optical stationary table or other holding apparatus, represented by table 12a in FIG. 6, can be employed to advantage. A reader 10 holdable by table 12a or like holding means is nonetheless considered a hand held reader as such term is used herein.

At the front of housing 12 is a clear window 22 having a clear aperture section 24 (shown in phantom) that serves as the entrance to the reader's imaging system as described more fully hereinafter. The imaging system to be described later has a rectangular field of view, the horizontal portion of which is shown in FIGS. 1 and 2 as being bound by field rays 26, which subtend an angle of approximately 20°. The vertical field of view of the imaging system will typically be smaller because the imaging system photodetector will normally be rectangular and positioned with its short dimension oriented vertically, as will also be shown in more detail hereinafter.

As best seen in FIG. 1, a matrix or 2D type of bar code 28 is shown positioned at a nearby distance and may be illuminated with a diffuse type of lighting, as indicated by an illumination pattern designated generally by 30, where available ambient light levels are too low to provide adequate signal levels.

Also seen in FIG. 1 is a targeting line 32 that is in the form of a line image of a light source that is projected through various elements of the reader's objective taking lens as subsequently described. The extreme ends of targeting line 32 are sized to be inside of the reader's field of view. In operation, targeting line 32 serves as a means by which the user positions reader 10 with respect to a 2D symbology, e.g., symbology 28, to assure that the symbology is within the reader's field of view, i.e., the reader can "see" it, and that the reader 10 will be spaced from a symbology by a distance which will enable the reader 10 to sharply focus the symbology via the reader imaging system such that the detailed pattern by which information is embedded in the symbology can be resolved to extract meaningful information. As will be explained more fully hereinafter, focusing and low light level detection also preferably take place through the lens by using at least part of the available photodetector pixels.

Referring now to FIG. 2, it can be seen there that reader 10 also can be used to provide signals by which linear, or 1D, bar codes such as that generally designated at 34 can be decoded. Because bar code 34 is more distant than symbology 28 in FIG. 1, a different type of artificial illumination may be employed where ambient light levels are inadequate. This type of artificial illumination as indicated generally by the pattern at 36 which is more directional (only partially diffuse) than the diffuse pattern of that at 30 but, even so, is sufficiently far from the bar code so that the structure of the illumination contributes nothing to the image which would render it unreadable. Put another way, a bar code when illuminated with this second kind of artificial illumination is in the far field of the artificial sources and thus does not appear as structure of the code. Here again, targeting line light 32 is shown just extending over the extreme edges of bar code 34 for reasons set forth above.

In operation, a user depresses button 16 (or 16a) which turns on the targeting light 32, and the reader's low light illumination detection system. If low light is detected, the reader artificial illumination systems are activated, preferably in a flicker mode to conserve power, especially where batteries are used to power microprocessor 17 and other system components. Once the targeting line light 32 is visible, it is used to position a symbology with respect to the reader's imaging system. Meanwhile, reader 10 operates to focus the objective lens of the imaging system on the symbology, and light 18 indicates that these operations are underway. Once a symbology is decoded, i.e., the image has been acquired and its associated signal processed and decoded, light 20 indicates that the reading operation was successful. In this connection, an audible signal or strobe light signaling may also be provided or used instead of light 20 for this purpose, as already mentioned.

Figure 3:
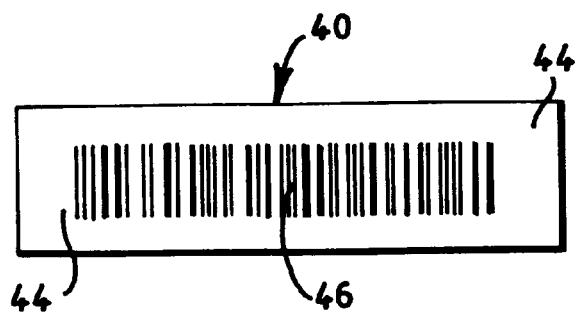
FIG. 3 is a diagrammatic plan view of a linear, or 1D, type symbology that the invention is capable of imaging.

Referring now to FIG. 3, there is shown a linear (or 1-D) symbology 40 that is one of the types of symbologies that may be decoded via reader 10. The information in such a symbology is contained in a series of modules which are formed by alternating the width of a series of parallel lines. As is conventional and typical of such bar codes, a linear bar code 40 consists of quiet zones 44 at each extreme of the code, start and stop modules at each end of the code, and the actual information carrying modules 46 in the center. Information is only encoded in the horizontal dimension (width), with the vertical dimension (height) being used redundantly. Because of this, these codes have relatively large width (perhaps up to four or more inches) compared with their height (one-half to one inch), and this basic structure results in a relatively inefficient storage of information per unit of occupied area.

Figure 4:
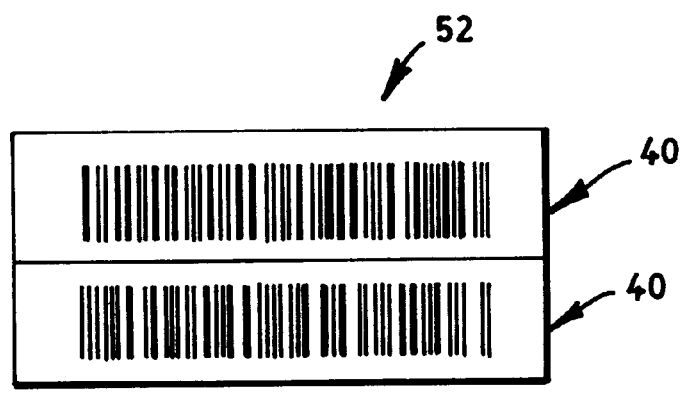
FIG. 4 is a diagrammatic plan view of a "stacked" type of symbology which the invention is capable of imaging.

The need to encode more information per unit area has driven the development of two-dimensional symbologies. One method to increase efficiency of such codes is by reducing the amount of vertical redundancy (in effect making shorter bars) while keeping a large sized find pattern at both ends of the code. FIG. 4 shows what is referred to as a "stacked" code 52. Because of the loss of vertical redundancy, artifices such as row/column indicators may have to be introduced to ease user operation.

It should be appreciated that where 1-D codes 40 and stacked codes 52 are designed for scanning by lasers, when imaged they can be decoded via the present invention with suitable algorithms.

Figure 5:
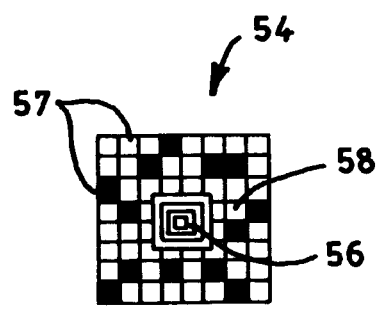
FIG. 5 is a diagrammatic plan view of a matrix, or 2D, type of symbology which the invention is also capable of imaging.

Another type of 2-D symbology is known as a matrix code. FIG. 5 shows a typical matrix, or 2D, type code 54, which is also of the type that can be decoded via reader 10. Matrix technologies offer higher data density rates than stacked codes in most cases, as well as orientation independent scanning. A matrix code is made up of a pattern of cells where the cells are typically square, hexagonal, or circular in shape. Such codes typically have a location section 56, a clocking section 57, and an information section 58. Data is encoded via the relative positions of these light and dark areas, in relationship to the clock signal. Like the more advanced stacked codes, error correction encoding schemes are used to improve reading reliability and enable reading of partially damaged symbols.

The powerful combination of imaging, relaxed printing/marking tolerances, absence/presence information encoding and error correction, allow for matrix symbols to be printed, etched, dot-peened, sprayed, or affixed. Typically, matrix codes have higher information density capacity, generating smaller codes for a given cell size (i.e., pels). Information is typically encoded via pel sizes of 5, 7.5, 10 or 15 mils. Because of these properties, reader 10 needs to be able to be much closer to such codes than is the case for linear codes.

While size (and the desire for small pel sizes) will drive matrix code applications, 1-D code requirements will be driven by width. Nevertheless, coexistence of both matrix and 1-D bar codes is envisioned for a number of years. The imaging subsystem of reader 10 is uniquely suitable for decoding both types of codes over a working distance that ranges from about 1.5 inches to 16 inches.

In addition, the image captured can also be utilized for further processing. Printed text within an image, with or without 1-D or 2D symbology information, may be processed using optical character recognition (OCR) algorithms to render machine-readable information. In addition, again with or without 1-D/2-D information, the image may be parsed and/or compressed for further processing at a remote site or later time.

The variety of applications for 2-D codes can be glimpsed from sampling, for example, the "A"s shown in a number of industry standards (e.g., EIA-706 Electronic Industry Association, Component Marking Standard; SEMI T2-95 Specification for Marking of (Silicon) Wafers with a 2-D Matrix Code; AIAG B-4 Automotive Industry Action Group Component Marking Standard; or the proposed UPU S28-1 Universal Postal Union (none of which are shown).

Figure 6:
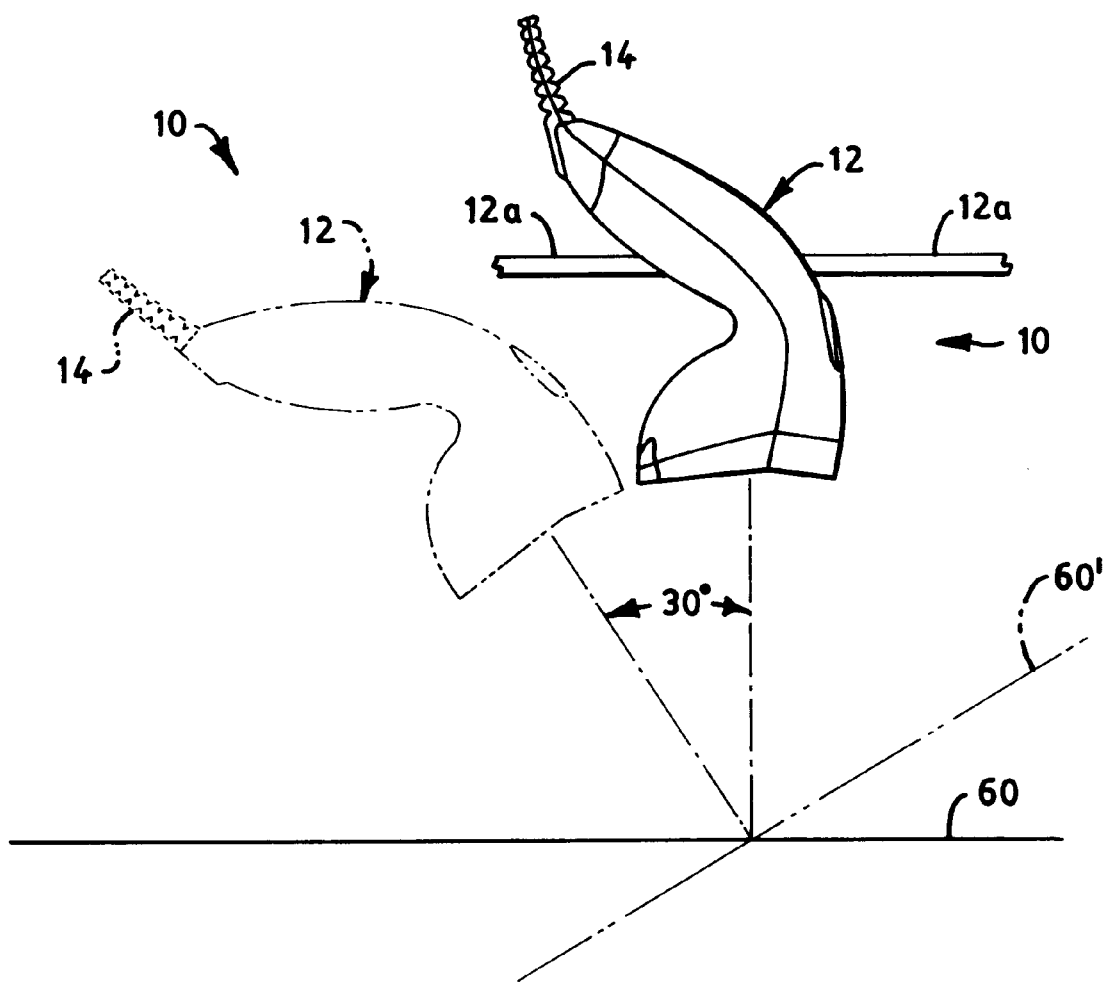
FIG. 6 is a diagrammatic elevational view of the invention of FIGS. 1 and 2 shown in solid normal to a plane in which a symbology may reside and in phantom inclined at an angle of approximately 30° to that plane to illustrate the omnidirectional imaging capability of the invention.

As mentioned earlier, bar code reader 10 has the property of being capable of imaging codes in omnidirectional fashion. This property is illustrated in FIG. 6 which shows reader 10 in solid lines reading a code normal to a surface 60 to which a code has been applied. In phantom, reader 10 is shown reading the same code inclined at 30° to surface 60. As also shown in FIG. 6, reader 10 can be held in stationary fashion in, for example, a notched holder 12a for the reading of code applied to a surface 60 which is movable to a different position shown in phantom as surface 60'. Thus, relative movement between reader 10 and surfaces (60, 60') carrying code to be decoded is accomplished by movement of either or both of the reader and the code surface.

As will be appreciated, reader 10 may also be rotated about the normal at a thirty degree tilt and still read a code, thus being omnidirectional. As will be seen, this property is a consequence of the ability of the objective lens to adequately resolve detail even when in the illustrated tilted attitudes shown in FIG. 6.

Figure 7:
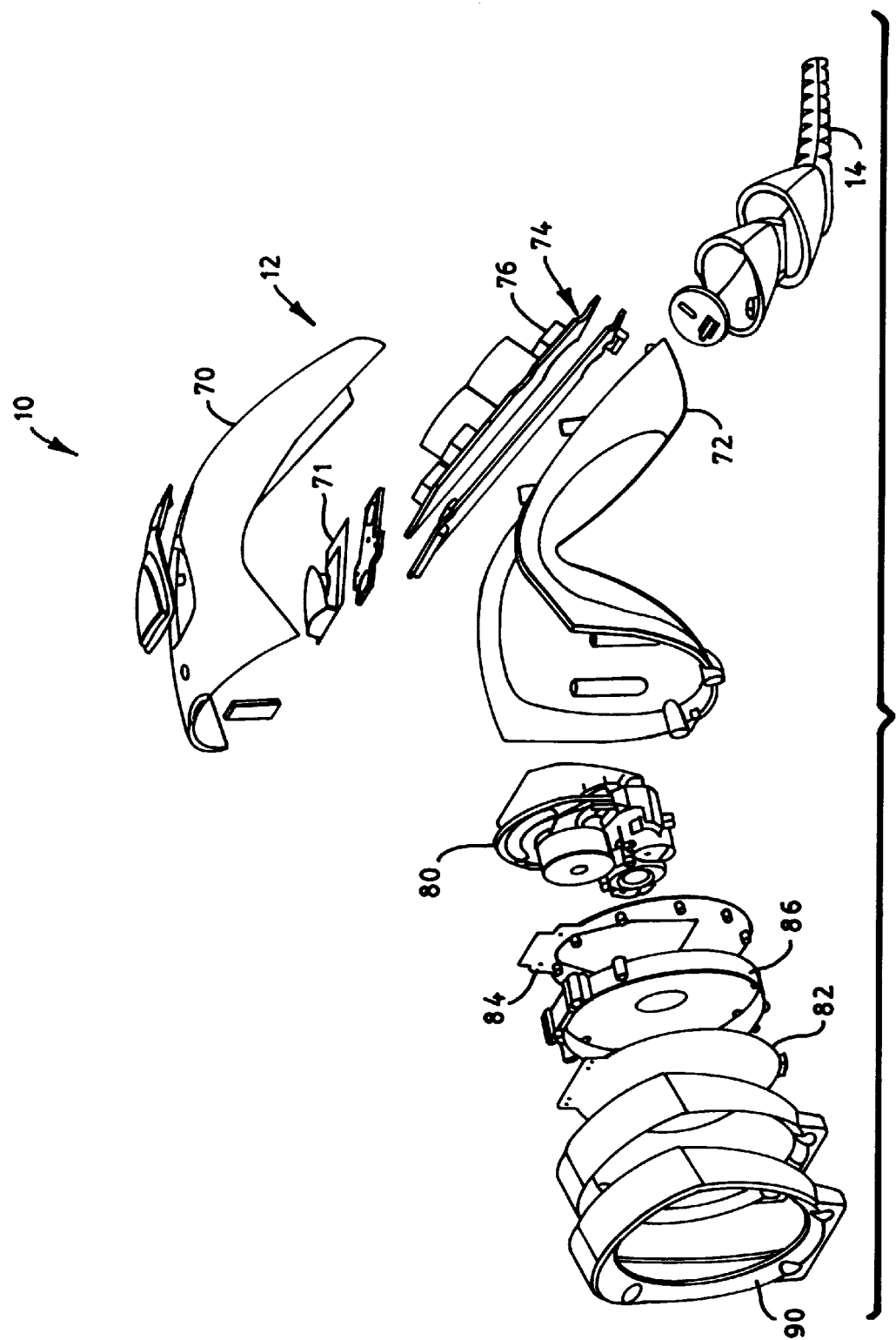
FIG. 7 is an exploded diagrammatic perspective of the invention of FIGS. 1 and 2 illustrating its major subassemblies.

As seen in exploded fashion in FIG. 7, housing 12 of reader 10 comprises a top housing section 70 and a bottom housing section 72. Sandwiched between top housing section 70 and bottom housing 72 is a CPU board 74 which carries a power control board 76. Button 16 (16a) fits in top housing section 70 with portions of it extending through to activate a two-position switch assembly 71 previously mentioned. Cable 14 is attached to housing 12 in a well-known manner to relieve any strains imposed during use.

In the forward section of housing 12 is located the previously mentioned reader imaging system that is designated generally at 80, a dark field illuminator 82 that operates in combination with a diffusing reflector 86 to provide the previously mentioned diffuse illumination pattern 30, and a bright field illuminator 84 that operates to provide the partially diffuse illumination pattern 36 shown in FIG. 2.

Also included is a bezel 88 and front cover that operate to provide various system access openings while assisting in excluding unwanted radiation from entering imaging system 80.

Figure 8:
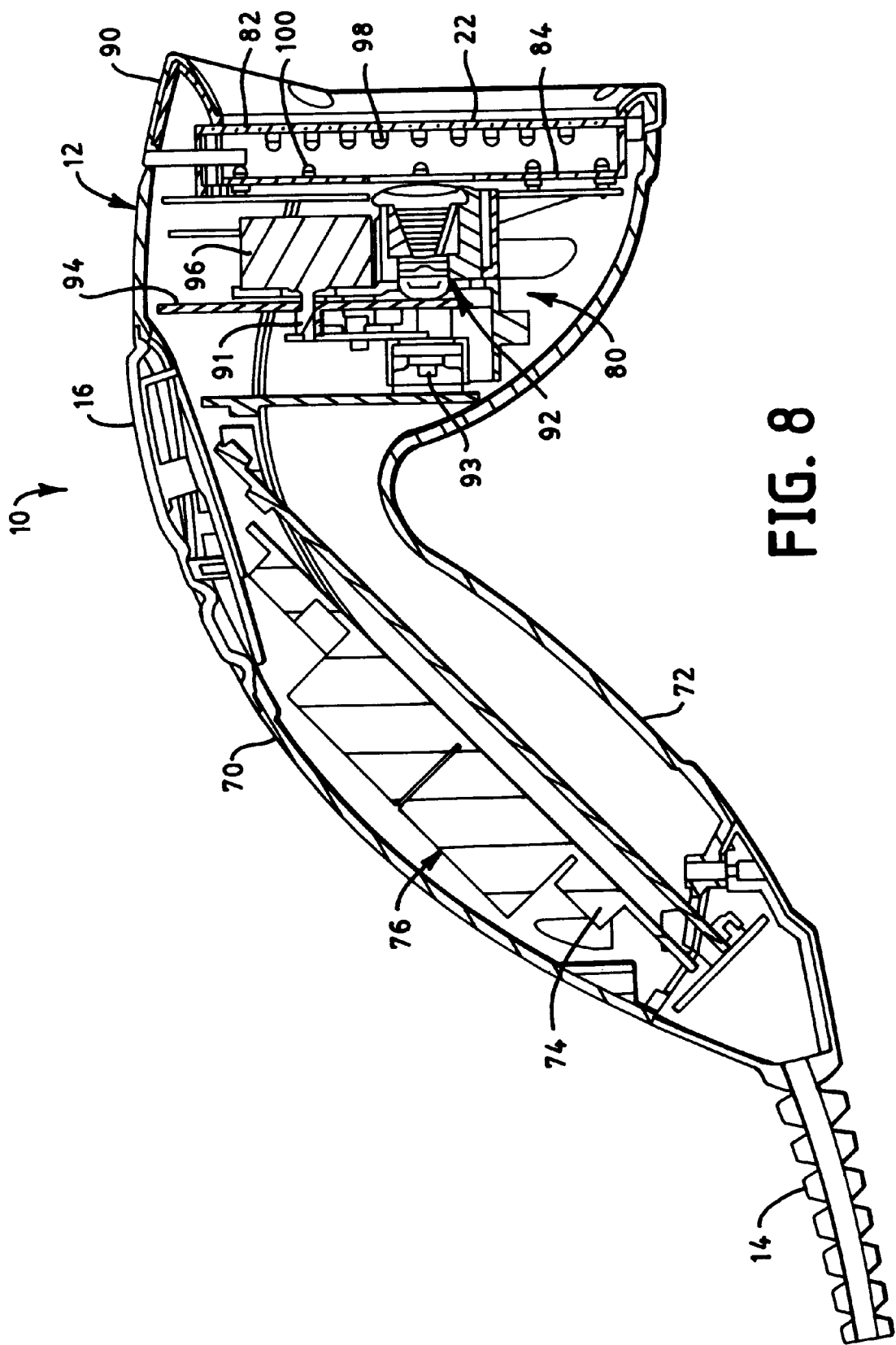
FIG. 8 is a cross-sectional elevational view of the invention of FIG. 1 taken generally along lines 8—8 thereof.

Referring now to FIG. 8, it can be seen that imaging system 80 includes an objective taking lens 92 and a focusing disk 94 therefor which carries various optical bi-plano parallel plates (i.e., optical shims) to provide a zone focusing lens to be described in more detail later. Disk 94 is rotationally driven at approximately 600 RPM by a motor 96 that is mounted about an axis of rotation 91 that is offset with respect to the optical axis, $O_A$, of imaging system 80. Motor 96 is operated under the control of microprocessor/computer 17 and/or CPU board 74. The rotational speed of disk 94 can vary over a considerable range. Any speed sufficient to permit sampling through optical zones of disk 94 can be employed, although it will be desired from a practical point of view to rotate the disk at a speed that permits sampling within a practical and efficient time frame and is fast enough to reduce blurring effects due to hand motion. Operation of disk 94 at very high rotational speeds that reduce image contrast undesirably should be avoided. Good results can normally be obtained at speeds in the range of 300 to 600 rpm.

Dark field illuminator 82 carries a series of light emitting elements 98 on an otherwise transparent substrate to illuminate a diffusing reflector 86 which in turn redirects the reflected illumination forwardly through clear window 22 to provide diffuse illumination pattern 30. In this connection, the surface of diffusing reflector is provided with scattering characteristics that are suitable for diffusing illumination incident thereto, and the size and location of emitting elements 98 are chosen so that they do not introduce shadowing at the plane of illumination.

Bright field illuminator 84 carries a plurality of light emitting elements 100 that radiate directly through clear window 22 to provide illumination pattern 36. Both types of illumination are under overall system control with pattern 30 being used primarily for nearby codes, particularly those with specular surfaces, and pattern 36 for distant codes where any structure in elements 100 is obscured on a symbology because of the distance between window 22 and a distant code. This arrangement reduces noise problems while increasing signal levels under what would otherwise be low ambient light conditions. Apparatus and methods for the illumination of machine readable symbologies are disclosed and claimed in the copending patent application of Howard Stern, for Diffuse Surface Illumination Apparatus and Methods, Attorney Docket No. RVCI-001, filed of even date.

The CCD detector is positioned along optical axis $O_A$ and is designated generally at 93. CCD detector 93 is rectangular in shape and has square active pixel areas that can, for example, be nominally 7.5 micrometers on a side and has VGA pixel arrangement, typically 640×480. While a CCD is illustrated here, it will be clear that CMOS detectors may be used in practicing the invention and other CCDs or CMOSs having different pixel active areas and resolutions may be used. However, as will be appreciated, the choice of pixel size does influence sensitivity to light and has an impact on lens focal length and aperture, or light gathering ability requirements.

Figure 9:
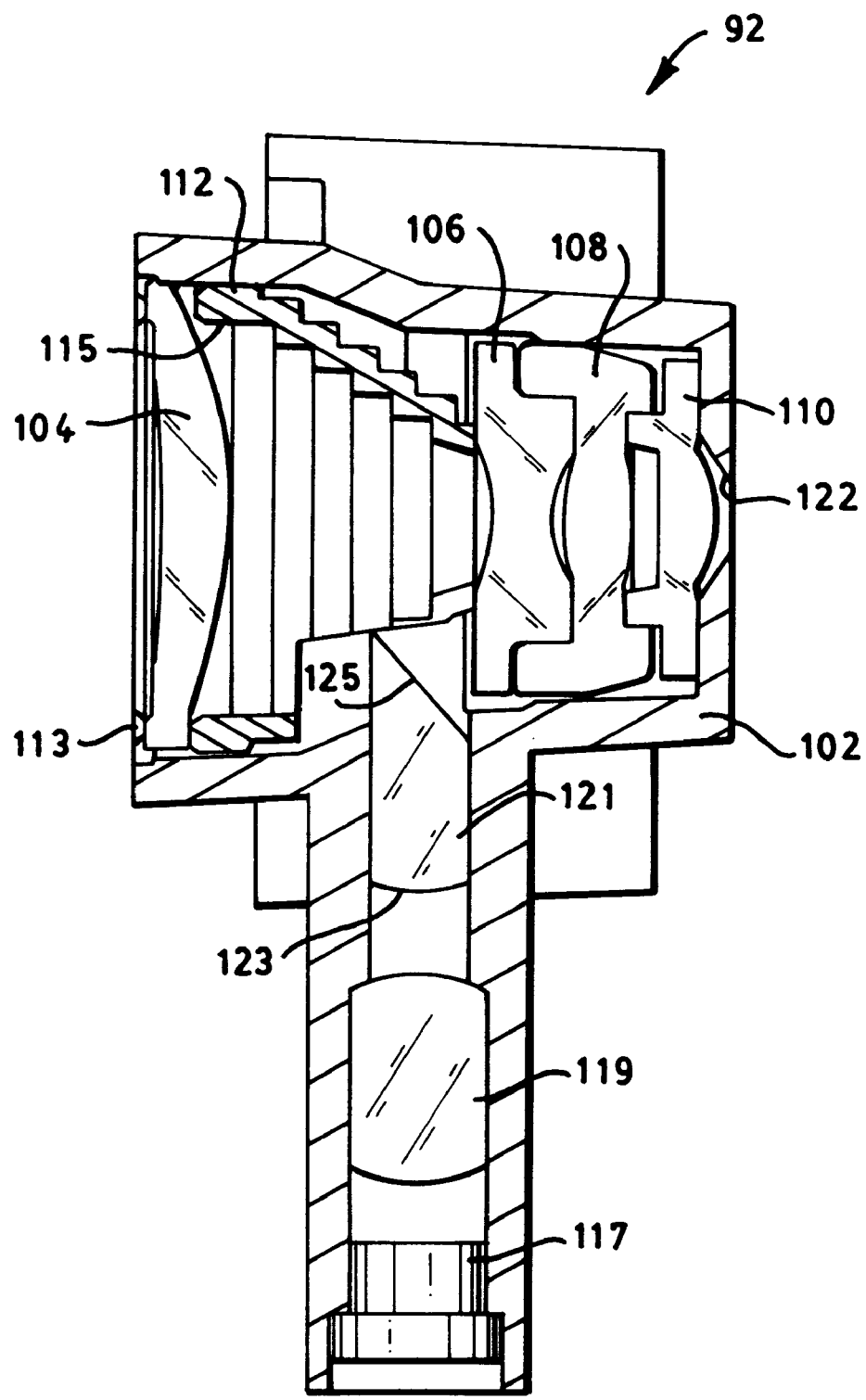
FIG. 9 is an enlarged mirror image of the cross-sectional elevational view of the objective taking lens of the invention shown in FIG. 8 absent the window and focusing disk thereof.

Referring now to FIG. 9, it can be seen that the objective taking lens 92 in the illustrated embodiment comprises an open-ended conical lens barrel 102 in which are arranged, in left to right sequence along optical axis $O_A$, a first positive lens 104, which is followed by a nested lens group comprising a negative lens 106, a following positive lens 108, and a final positive lens 110. Lenses 104 and 106 are of polycarbonate while lenses 108 and 110 are of acrylic.

A spacing element 112 is provided to set the axial separation between lens 104 and the following three-element group and has an internally serrated or stepped surface 115 for stray light control. As can be seen, lens elements 106, 108, and 110 are provided with complementary configured structures that facilitate the nesting of lens element 106 and 110 on either side of lens element 108. Lens element 108, in turn, includes an annular region that seats in lens barrel 102 to center the three-element group along the optical axis. Lens element 104 likewise is seated in the forward end of lens barrel 102 and on the forward end of spacer 112 to locate it axially and otherwise center it. All of the lens elements are retained in lens barrel 102 via a front cover 113 that snap fits to lens barrel 102.

Lenses 104–110, lens barrel 102, spacer 112, and front cover 113 are all preferably made of plastic so that they can be easily mass produced using injection molding techniques. In addition, the nesting properties of these elements make them amenable to automated assembly. However, it will be appreciated that the elements of objective taking lens 92 may be provided in suitable optical glasses or other suitable optical plastics as, for example, polystyrene.

Figure 10:
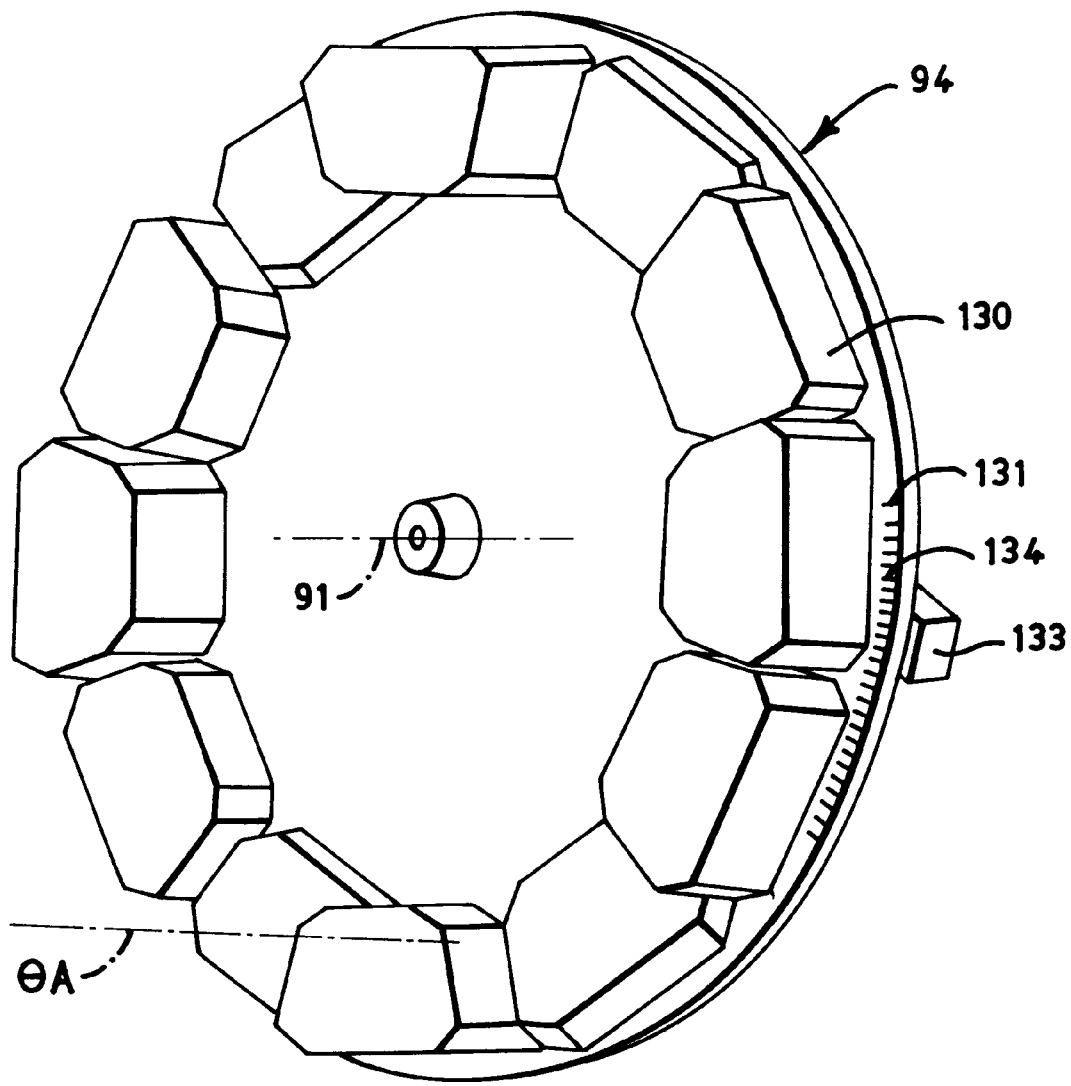
FIG. 10 is an enlarged diagrammatic perspective view of the focusing disk of the objective taking lens system of the invention shown in FIG. 8.

Referring now to FIG. 10, there is shown focusing disk 94 and its corresponding axis of rotation 91 that is offset with respect to optical axis $O_A$. Disk 94 is seen to comprise a series of more or less raised shims 130 each of which has a thickness suitable to focus light from the objective lens 92 on CCD 93 when a bar code is positioned in any of a number of corresponding zones forward of reader 10. Because the shims used in disk 94 differ in thickness for this purpose, the individual masses of the shims 130 are correspondingly different, and thus are arranged in staggered fashion near the circumferential edge of disk 94 for purposes of providing it with rotational balance as it spins at, for example, 600 RPM. This obviously reduces the level of vibration for reader 10 while being held by hand and also assures adequate motion stopping ability during the interval during which an image is captured on CCD 93. Shims 130 are preferably molded of light transmitting polycarbonate, or other suitable optical plastic, to required thickness and fixed in place via ultrasonic welding. If desired, disk 94 can be molded or machined as a unitary structure having surface topography or structure adjacent the circumferential edge of disk 94 and predetermined to provide desired optical properties. A disk 94 formed by extrusion molding material, such as polymethylmethacrylate or polycarbonate, can be employed. Shims, or other optical control surfaces to be described, operate to maintain the apparent location of CCD 93 constant as seen through objective lens 92 from different bar code positions and hence maintain the required image quality for bar codes in different positions. For this purpose, twelve bosses have been provided for one exemplary lens prescription to be described.

Figure 21:
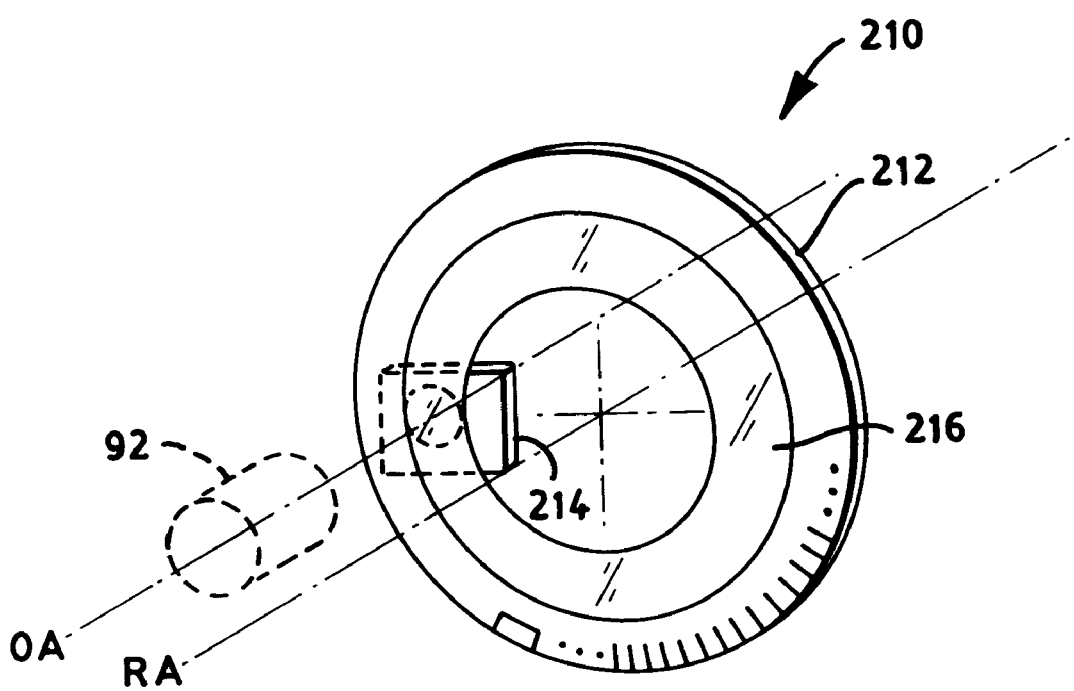
FIG. 21 is a diagrammatic perspective view of a rotating disk having a continuous "quintic" or "quintic and shimmed" surface that may be used to focus the objective taking lens of the invention.

Disk 94 is provided with a position encoding strip 134 (only partially shown) that is decoded in a well-known manner via a photodetector and associated electronics 133 to permit the position of a particular shimmed boss with respect to the optical axis $O_A$ to be determined and set as required. Here, the position encoding strip 134 includes a reference symbol 131 which informs the encoder that the disk 94 is in alignment with the reference location. From the reference location, decoder 133 counts pulses generated by passing light and dark lines provided on encoding strip 134. The light and dark lines are of sufficient density to provide precise position information regarding the angular location of the disk 94 as it rotates since the number of pulses can be summed up with respect to the reference position. As shown in FIGS. 10 and 21, reference symbol 131 and encoding strip 134 are shown on the periphery of disk 94. If desired, reference symbol 131 and encoding strip 134 can be positioned on disk 94 inwardly of shims 130 in a circle concentric with the periphery of the disk. Decoder 133 can be positioned correspondingly for decoding of encoding strip 134.

In this connection, the focus zone that is appropriate for a particular symbology position is determined by a through the lens ranging system that utilizes a part of the active area of the CCD 93. Here, as the disk is rotating, the image formed on a line of CCD pixels is used to generate an electrical signal whose high frequency content is filtered and analyzed. The shim that produces the highest high frequency image is deemed to be the one that should be used to image the entire bar code and information regarding its position on the disk is determined from decoder 133 which then dictates when the exposure interval during which an image is captured is to take place. Image capture takes place over a 4 ms interval via well-known video capture techniques, and the resultant signal is sent via conventional protocols to CPU 76 and/or microprocessor/computer 17 for decoding analysis.

A variable focus optical system inclusive of that employed as the focusing element of the subject hand held symbology reader, is disclosed and claimed in the copending patent application of Steven Fantone, et al., for Variable Focus Optical System, Attorney Docket No. 8361, filed of even date.

Referring once again to FIG. 9, there is shown a pick-off mirror element 121 that is positioned in the intervening space between first element 104 and second element 106, nearer second element 106, and just outside of the marginal ray bundle defining the system field of view so as not to reduce signal strength by blocking light traveling along the taking path to the CCD. Pick-off mirror element 121 includes a rotationally symmetric rear surface 123 and a mirror surface 125. The mirror surface may operate by total internal reflection or be provided with a reflecting coating. Aspheric surface 123 and mirror surface 125 operate in conjunction with an LED 117 and a bi-cylindrical lens 119 to project targeting light line 28 substantially along the optical axis $O_A$ with a small amount of parallax in the horizontal plane, but none in the vertical plane. In this connection, LED 117, which has a typical asymmetric energy output, is focused in one azimuth to a sharp line about 120 mm forward of mirror surface 125 via bi-cylindrical lens 119 and aspheric surface 123 operating in concert with one another, and in the other azimuth, it is focused by bi-cylindrical lens 119 onto the mirror surface 125. From mirror surface 125, the image formed thereon diverges into object space to provide targeting line 28. At nearby distances of approximately 1.5 inches, the horizontal parallax of targeting line 28 is at its maximum, but even so is less than 6 mm from optical axis $O_A$. LED 117 is preferably red in color for visibility and has an output power in the range, for example, including 3 to 5 mW.

Figure 9A:
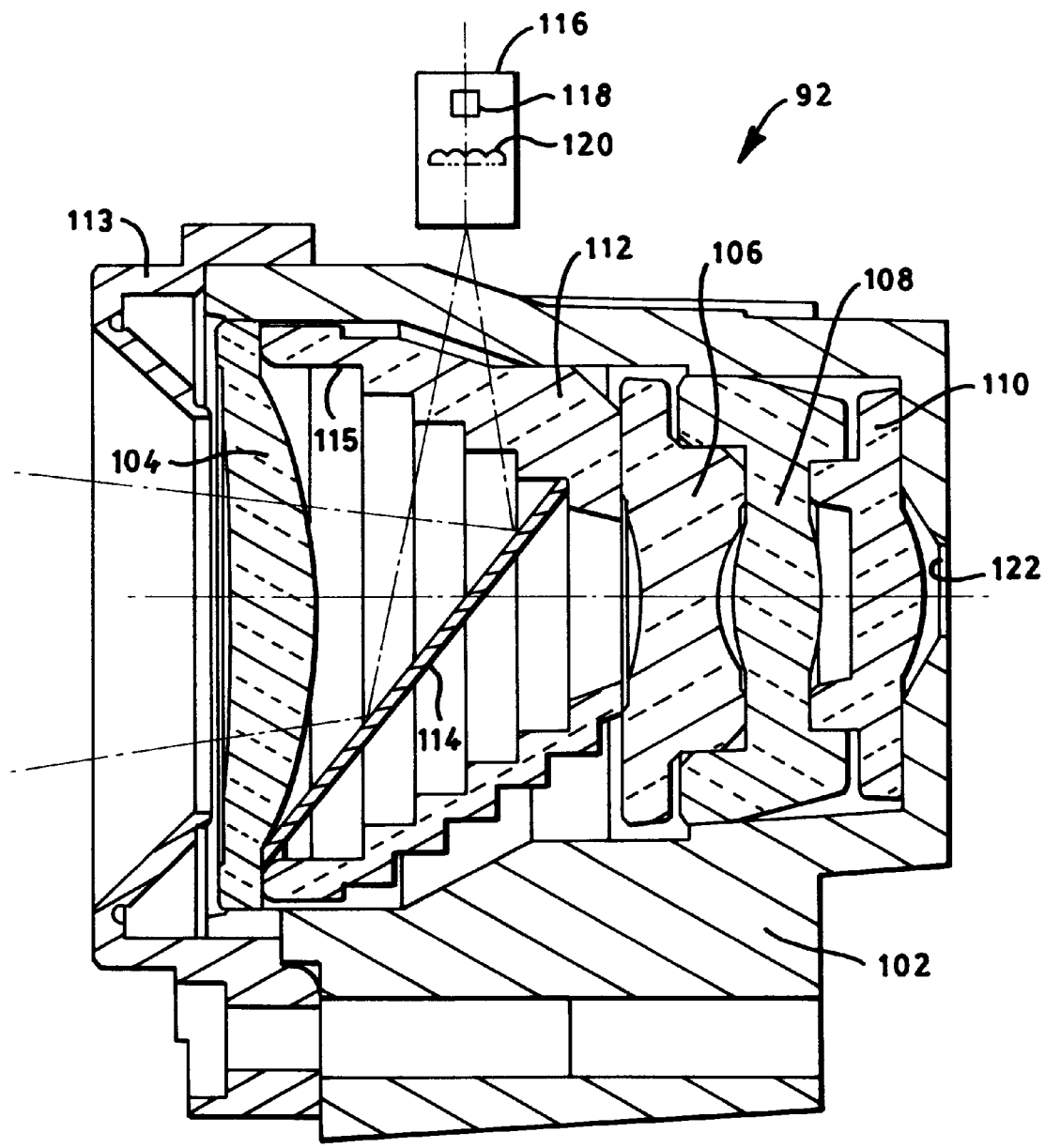
FIG. 9a is an enlarged mirror image of a cross-sectional elevational view of an alternate objective taking lens of the invention absent the window and focusing disk thereof.

Referring now to FIG. 9a, there is shown an alternate means by which the targeting line 28 may be generated. As shown there, a partially reflecting partially transmitting beamsplitter 114 is positioned in the intervening space between first element 104 and second element 106. Beamsplitter 114 is used in conjunction with a light module 116 to project targeting light line 28 along the optical axis $O_A$ without parallax. In this connection, a source 118, such as an LED or the like, is reshaped via a lenticular screen 120 or other suitable beam shaping, e.g., anamorphic, optics. The line image is projected onto the forward facing surface of beamsplitter 114 which reflects, for example, 10 percent of its intensity toward object space. Ninety percent of light from a bar code image is under these conditions transmitted through beamsplitter 114 to travel to CCD 93. Obviously, these percentages may be changed as requirements vary, the tradeoffs being the visibility of the targeting line 32 and the need for adequate signal levels.

Figure 11:
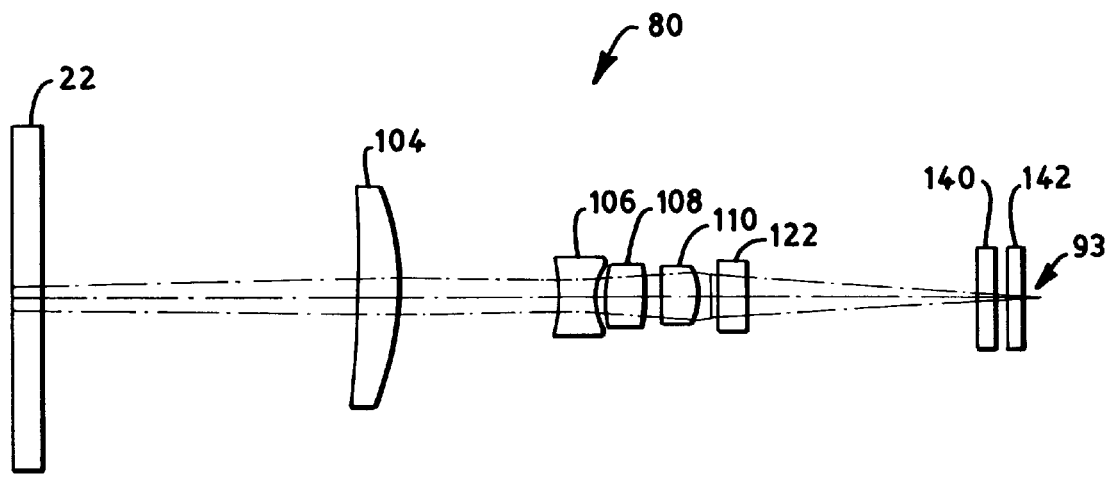
FIG. 11 is an optical layout of the imaging system of the invention for an object (symbology) in the nearest focus zone of the imaging system (light travels through the system from left to right)
Figure 12:
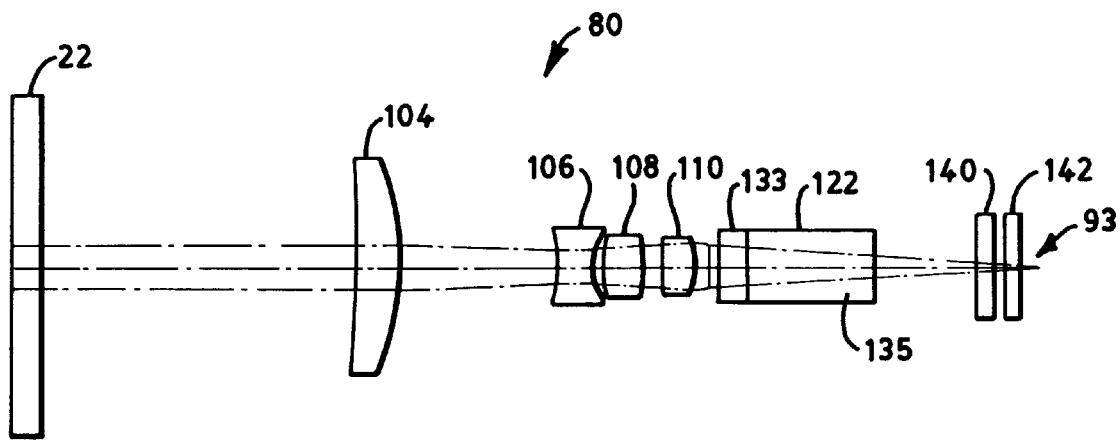
FIG. 12 is an optical layout of the imaging system of the invention for an object (symbology) in the farthest focus zone of the imaging system (again, light travels through the system from left to right)

The optical layout of the imaging system 80 is shown respectively in FIGS. 11 and 12 with two different shims in place. FIG. 11 shows a shim 132 that represents the system configuration for extreme nearby focus. Here, the thickness of the shim 132 is simply the base thickness of the polycarbonate disk 94 itself. FIG. 12 shows the system configuration for the farthest focus zone where it is seen that shim 132 comprises base thickness section 133 and add-to thickness section 135, which in reality comprise a continuous piece of plastic of the overall needed thickness for that zone. In the following prescription data, it will become apparent that the thicknesses of all the shims include the base thickness and its corresponding add-to thickness.

As seen in FIGS. 11 and 12, the imaging system comprises, in addition to previously recited elements, a physical aperture stop 122 (See also FIG. 9), a cold window 140 to reject unwanted IR, and a transparent protective cover window 140 for CCD 93. As previously mentioned, aperture 24 in FIG. 1 is simply a defined section of clear window 22.

The complete lens prescription for the layouts of FIGS. 11 and 12 is given in Table I in the form of a standard output file from a commercially available optical design program. The design was optimized at the nearest (42 mm) and farthest (360 mm) optimal working distances, referred to as Configuration 1 and Configuration 2 in the prescription.

Additional considerations in implementing the inventive imaging system are set for forth in the following discussion in which the definitions below have been adopted.

Working Distance. This refers to the distance from the exterior surface of the window to a bar code. This is consistent with the conventional usage of the term if one considers the window to be the first element in the optical assembly.

F-number, F-stop, or F/#. This term refers to the image space F/#, which is the ratio of the effective focal length (EFL) of the lens to the paraxial diameter of the entrance pupil. It is important to understand that this characterizes the light-gathering ability of the lens for objects at infinite conjugates.

Working F/#. The working F/# is defined by:

$$W = \frac{1}{2\sin\theta},$$

in which $\theta$ is the angle that marginal rays make with the optical axis at the image plane. The marginal ray is traced at the specified conjugate.

Pixel. A CCD sensor element

Pel. A two-dimensional bar code picture element

As explained earlier, the imaging optics were designed to form images (e.g., one and two-dimensional symbols) on a CCD sensor over a range of device-to-object distances, within the lens parameters and constraints presented below. Further considerations in the design having to do with specific system applications were as follows, but should only serve as a guide and in no way should be construed as limiting the teachings of the invention.

As described earlier, the one-dimensional bar codes consist of a series of alternating black and white lines of varying thickness, where data is encoded by the relative positions of the transitions from black-to-white or white-to-black while the two-dimensional bar codes comprise a number of different symbologies, but each is essentially a grid of square pels that are either nominally black or nominally white.

The closest acceptable working distance is considered to be 38 mm (1.5 in). Furthermore, no target is to be placed at a working distance greater than 400 mm (15.75 in.) in order to fill the format in any orientation.

The lens is of fixed focal length. Various magnifications are be achieved by varying the working distances within the range given above. The smallest two-dimensional bar code pel dimension to be imaged is about 0.13 mm (5 mil), and this covers at least 3 CCD pixels when aligned with the orientation of the CCD pixels. The longest one-dimensional bar code target to be read is about 100 mm (4 in). The target resolution required to find the edges in this target is typically set to 0.25 mm (10 mils).

No dynamic longitudinal translation of any component including the CCD is permitted. Focusing over the full range of working distances is achieved by inserting plano-parallel plates of different thickness into the back focus of the lens 92. These plates are mounted on a rotating disk 94 in such a manner that the optical axis passes through the wheel at a radius of 21.54 mm (0.848 in). This method of focusing divides the range of working distances into a number of discrete 'focus zones'. The image is best focused at the center of each zone and becomes increasingly less so towards the ends. The end of a zone is determined by the 'minimum modulation' part of the performance specification.

The lens is optimized over the full field (diagonal) of the CCD, with uniform weighting of all field points. This does not imply that the performance is the same over the entire field. The rationale behind optimizing over the full field is that the largest bar codes may cover much of the field in one dimension and may be off-center in the other. Also, this approach allows for some misalignment of the CCD with the optical axis during assembly.

At any point within the full range of working distances, the minimum design modulation for an on-axis field point is about 20% at 66 line pairs/mm in image space. No vignetting is permitted over the entire field of the CCD, recognizing that some decoding algorithms are sensitive to changes in illumination across the image.

The lens 94 is achromatized over that part of spectral range of the sensor coincident with the visible part of the spectrum. A filter was provided to attenuate transmitted light in the near infrared part of the spectrum. In designing lens 94, it was assumed that the target may be illuminated by room lighting, sunlight, or by a bank of red LEDs on the device in the event that the background illumination were insufficient.

The maximum permissible linear distortion from the center to the edge of the full field of the CCD, and over the full range of working distances, is ±2% as is shown FIGS. 17A, 17B, 18A and 18B.

Figure 19:
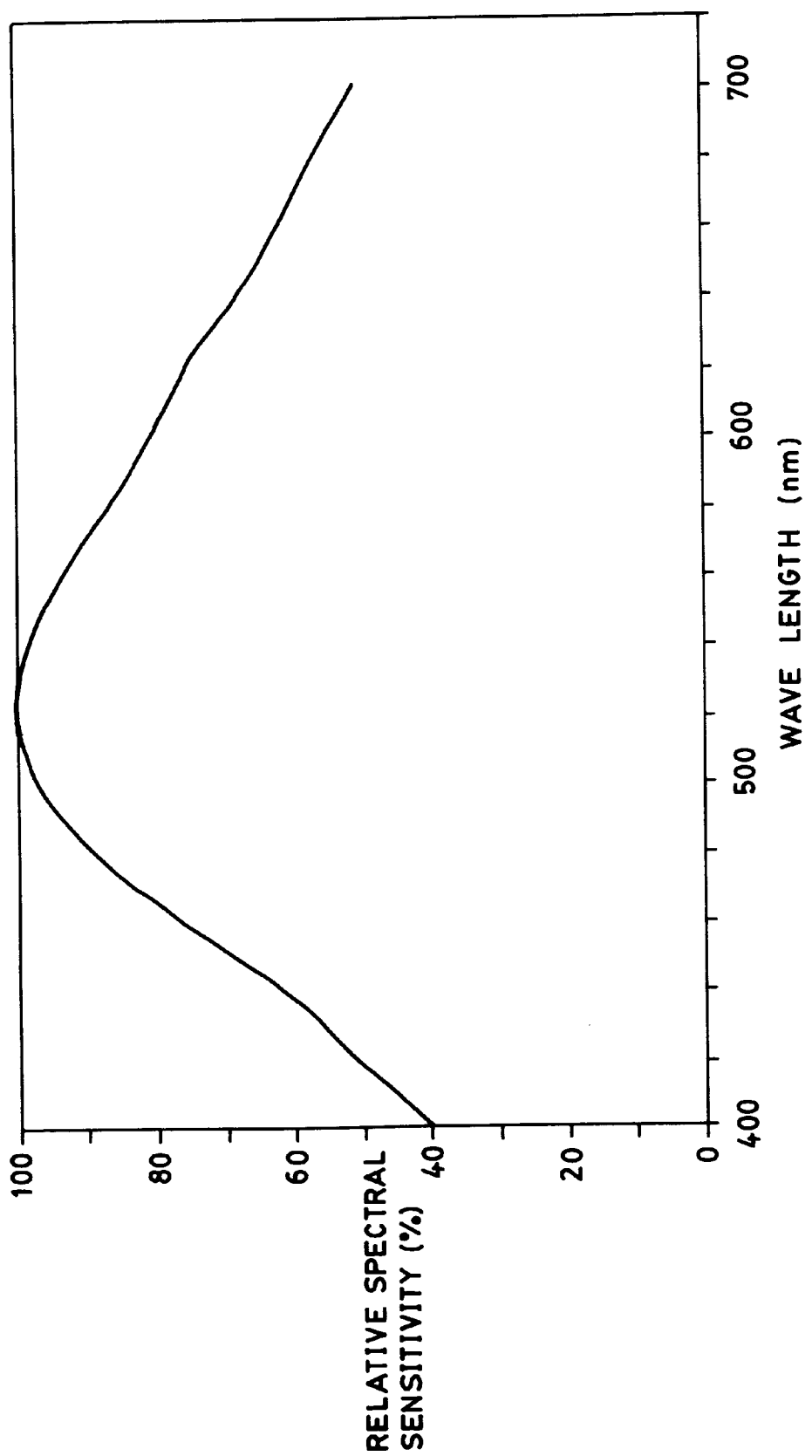
FIG. 19 is a graph showing the spectral response of a photodetector (CCD) of the type which may be used in conjunction with the objective taking system of the invention.

For design purposes, it was assumed that CCD 93 was to be, for example, a Panasonic MN3776AE device of size (H×V) 4.788×3.589 mm$^2$, comprising 640×480 square pixels having a 7.5$\mu$ pitch. The spectral response for this device is shown in FIG. 19. All lenses were made from plastic materials suitable for injection molding.

There were also a number of mechanical constraints taken into consideration; namely that:

(a) The distance from the inner surface of the front window to the image plane (CCD) was to be 51.806 mm.

(b) The distance from the inner surface of the front window to the vertex of the first element was to be 16.3 mm.

(c) The distance from the surface of the rotating disk nearest the target to the image plane (CCD) was to be 16.78 mm.

All optical surfaces are coated with a single-layer quarter-wave antireflection coating centered at 580 nm. This wavelength is a compromise between the peak sensitivity of the CCD (520 nm) and the illumination from the on-board bank of red LEDs (660 nm).

Figure 13:
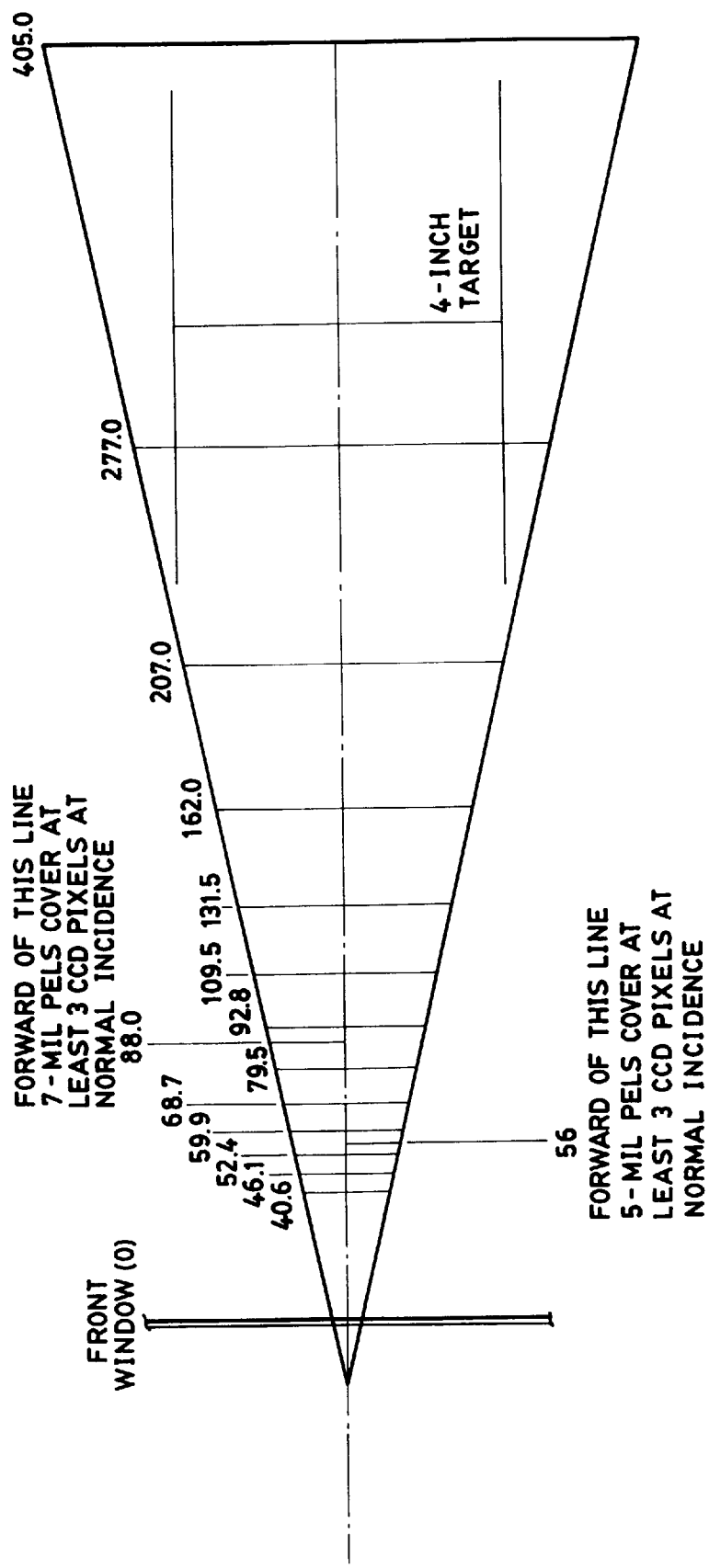
FIG. 13 is a diagram illustrating the various focus zones of the imaging system of the invention shown along with the field of view and the approximate working distances for imaging matrix and linear symbologies when one form of CCD photodetector is used in conjunction with the objective taking lens of the invention.

The adopted focus zones are delimited by the points at which the on-axis MTF falls to 20%. Using 12 zones allows an exposure time of 4 ms when the disc is rotating at 600 rpm. The zones are as shown, for example, in Table II and graphically in FIG. 13 for the horizontal field of view. FIG. 13 also shows the working distances corresponding to matrix bar codes with 5 mil and 7 mil pels.

Figure 14:
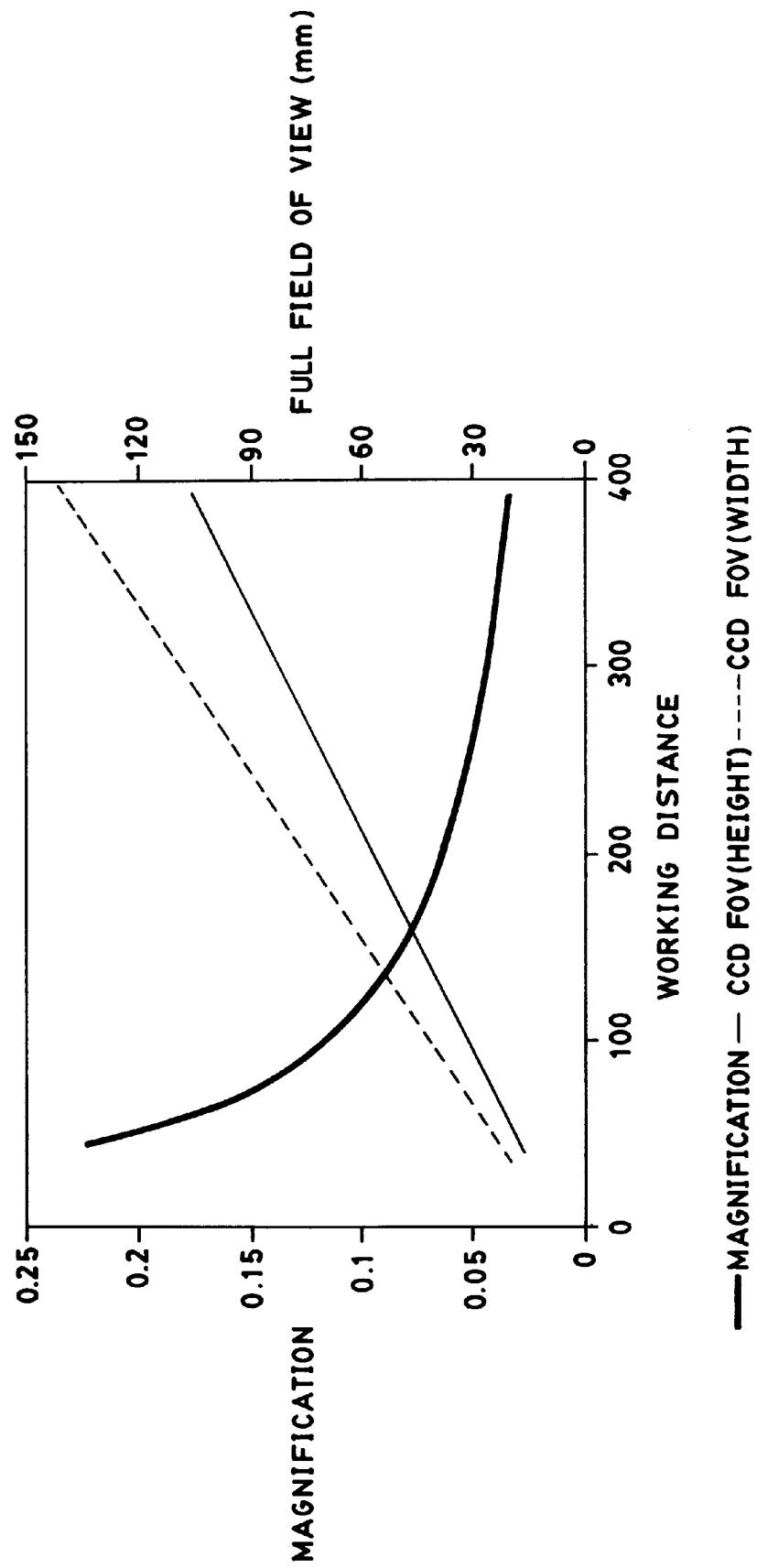
FIG. 14 is a graph showing the variation in magnification and horizontal and vertical fields of view of the invention with working distance for one form of rectangular CCD photodetector that may be used with the objective taking lens of the invention.

FIG. 14 shows the relationship between system magnification, horizontal (width) and vertical (height) field of view (FOV) and working distance in millimeters. Here, the magnification of the lens varies as a function of the working distance, and the image is always inverted. A first-order magnification calculation may be performed using the Newtonian form of the lens equation. For a system in air, such as this one, the absolute ratio of image to object height, m, is given by the relationship $$m=f/x,$$

in which $f$ is the focal length of the lens, in this case 14 mm, and x is the distance from the object to the first focal point of the lens. In lens 94, the first focal point lies 22.8 mm behind the front surface of window 22. The magnification equation therefore may be rewritten using the working distance x' (in mm) as follows:

$$m=14/(22.8+x').$$

This function has been plotted over the full range of focus zones in FIG. 14. The total field of view corresponding to the height and width of the CCD are also plotted in this figure.

More focus zones may be added by reducing the rotation speed of the disc or by decreasing the maximum exposure time. The performance at the ends of zones may be enhanced by adding more zones or by stopping the lens down. The zones in Table II have been distributed using the same end-zone criterion over the whole range of working distances. It is possible that experimental data in a particular case may indicate that some zones require better performance than others. In such cases, the zones may be redistributed in a non-uniform manner.

It is possible to achieve focus for objects closer than the 40.2 mm nearest working distance shown in Table II by adding zones with effectively negative plate thickness. This may be achieved by making the base thickness of the rotating disc less than 1.524 mm in those zones, but this may make the disc more difficult to mold successfully.

Figure 17B:
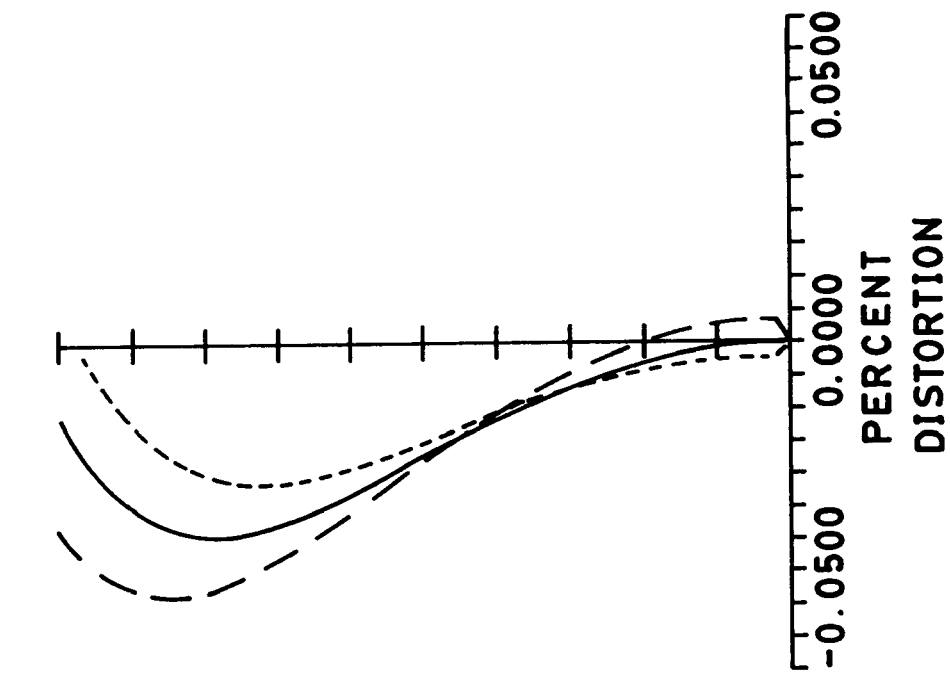
FIG. 17B is a graph showing the variation in saggital and tangential distortion with field position (position of the photodetector, and the vertical axis represents off-axis location) for the objective taking lens of FIG. 9 when operating in the closest focus zone (near working distance)
Figure 17A:
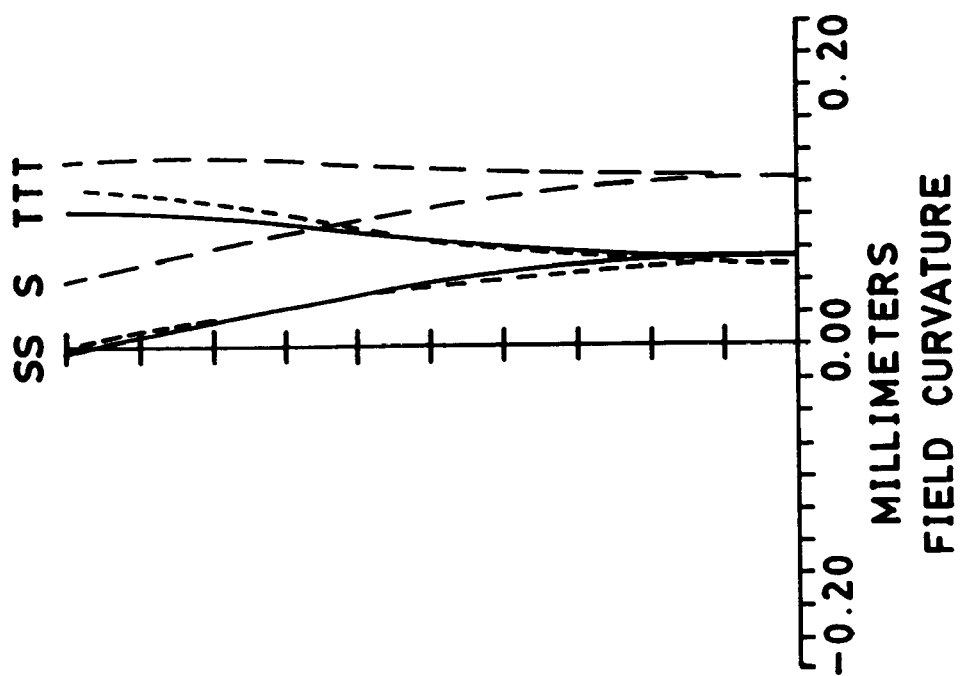
FIG. 17A is a graph showing the variation in saggital and tangential field curvature with field position (position of the photodetector, 0.0 is on-axis and the vertical axis represents off-axis location) for the objective taking lens of FIG. 9 when operating in the closest focus zone (near working distance)

The distortion of the lens varies as a function of its working distance. FIGS. 17B and 18B show distortion curves at the closest and furthest working distances, respectively. These graphs show the distortion from the center to the corners of the CCD along with field curvature.

To cover three CCD pixels with a 5 mil (0.127 mm) pel, a minimum magnification of 0.177× is required. Solving for x' in the magnification equation given above yields a furthest working distance for a 5 mil target of 56 mm. The range of working distances for this and larger targets are shown in Table III immediately below. These numbers assume that three pixels need to be covered by a target pel whose image is optimally aligned with the CCD pixels. If fewer pixels can be used to satisfy the Nyquist condition, the working distances will be longer.

TABLE III

Pel Size And Working Distance

| Pel Size (mil (mm)) | Furthest working distance for normal viewing angle (mm) | Furthest working distance for 30° viewing angle (mm) |
|---|---|---|
| 5 (0.127) | 56.2 | 45.6 |
| 7.5 (0.190) | 95.4 | 79.6 |
| 10 (0.254) | 135.2 | 114.1 |

Figure 15:
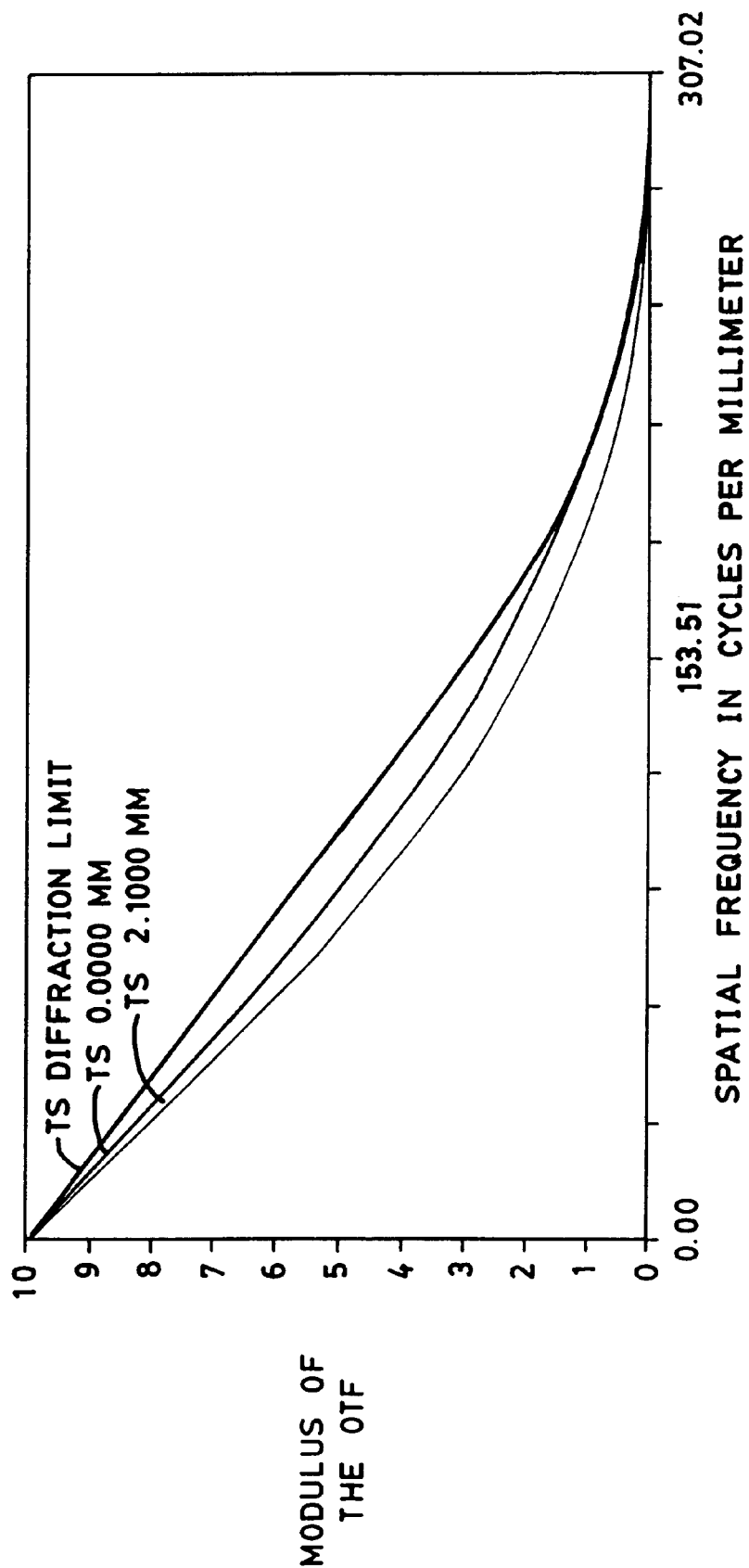
FIG. 15 is a graph showing the variation in the polychromatic modulation transfer curve with field position for the objective taking lens of the invention for an object at best focus in the nearest focus zone, along with a curve showing diffraction limited performance.
Figure 16:
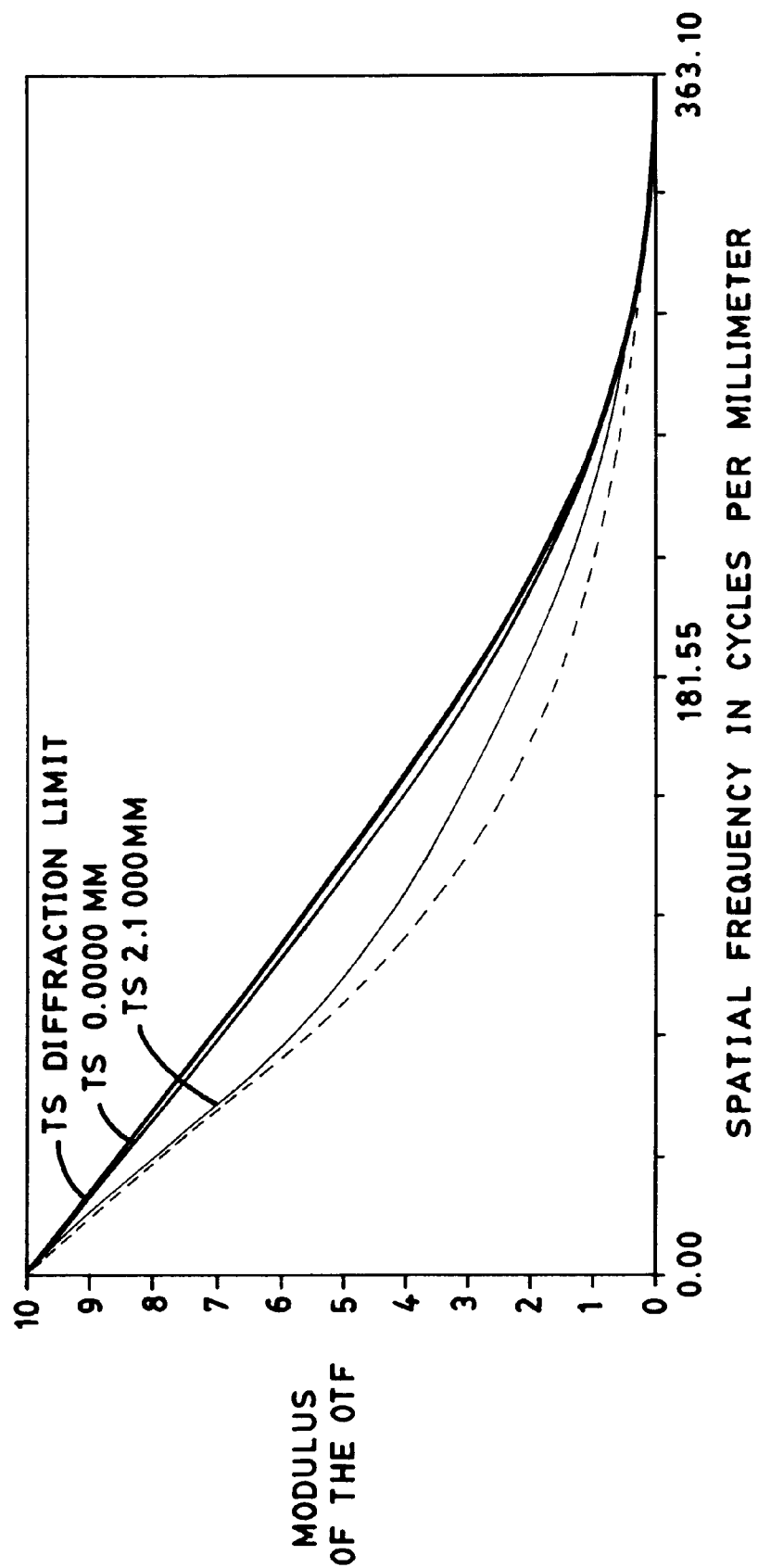
FIG. 16 is a graph showing the variation with field position of the polychromatic modulation transfer curve for the objective taking lens of the invention for an object at best focus in the farthest focus zone, along with a curve showing diffraction limited performance.

The variation with field position of the polychromatic MTF curves at the nearest and the farthest working distances are shown in FIG. 15 and 16, respectively. In each case the MTF shown is for the position of best focus within the zone along with diffraction limited performance.

Surface 15 of Table I in the lens prescription is a 1 mm-thick Schott BK7 substrate for a near infrared reflective coating. This is a multilayer dielectric stack having a transmission cut-on wavelength of 700 nm. Wavelengths longer than this will be reflected back out of the lens, while shorter wavelengths pass through to the detector 93. The purpose of this filter is to shield the CCD 93 from the large amount of near infrared light which the system might conceivable see, and to which the CCD 93 is still reasonably sensitive. The lens, however, is not corrected for these wavelengths.

The operating parameters given are for room temperature. However, since the lens elements and lens barrel are all made from plastic, their thermal coefficients of linear expansion will be similar and all parts will change dimension at approximately the same rate.

The lens has been optimized for a stop radius of 1.40 mm, at which setting the image space f/# is f/4.7. However, in order to achieve the performance specification at the ends of the focal zones, the stop radius was set to be 1.20 mm, corresponding to f/5.5. Should there be insufficient light at this stop setting, the lens can be used at its full design stop, but it must be clearly understood that the performance at the ends of the zones will deteriorate. In this case, it may be necessary to introduce more focal zones. If more light than is required for this design is typically available, stopping the lens down even further will greatly improve its performance within any given focal zone.

The clear aperture over the first surface (the surface of the first lens, not the window) of the clear aperture is currently 12 mm. Since this surface is far from the stop, the footprint of the rays through this surface roughly mimics the shape of the field stop, which in this case is simply the CCD 93. This means that it is possible to shape the clear aperture over the first surface to something like a rectangle with rounded corners without affecting the performance of the lens at all. Because of the manner in which the near field illuminator currently operates, there is the possibility of making the clear aperture of the first element as small as possible. This may be done at the expense of vignetting the rays in the corner of the field.

Figure 20:
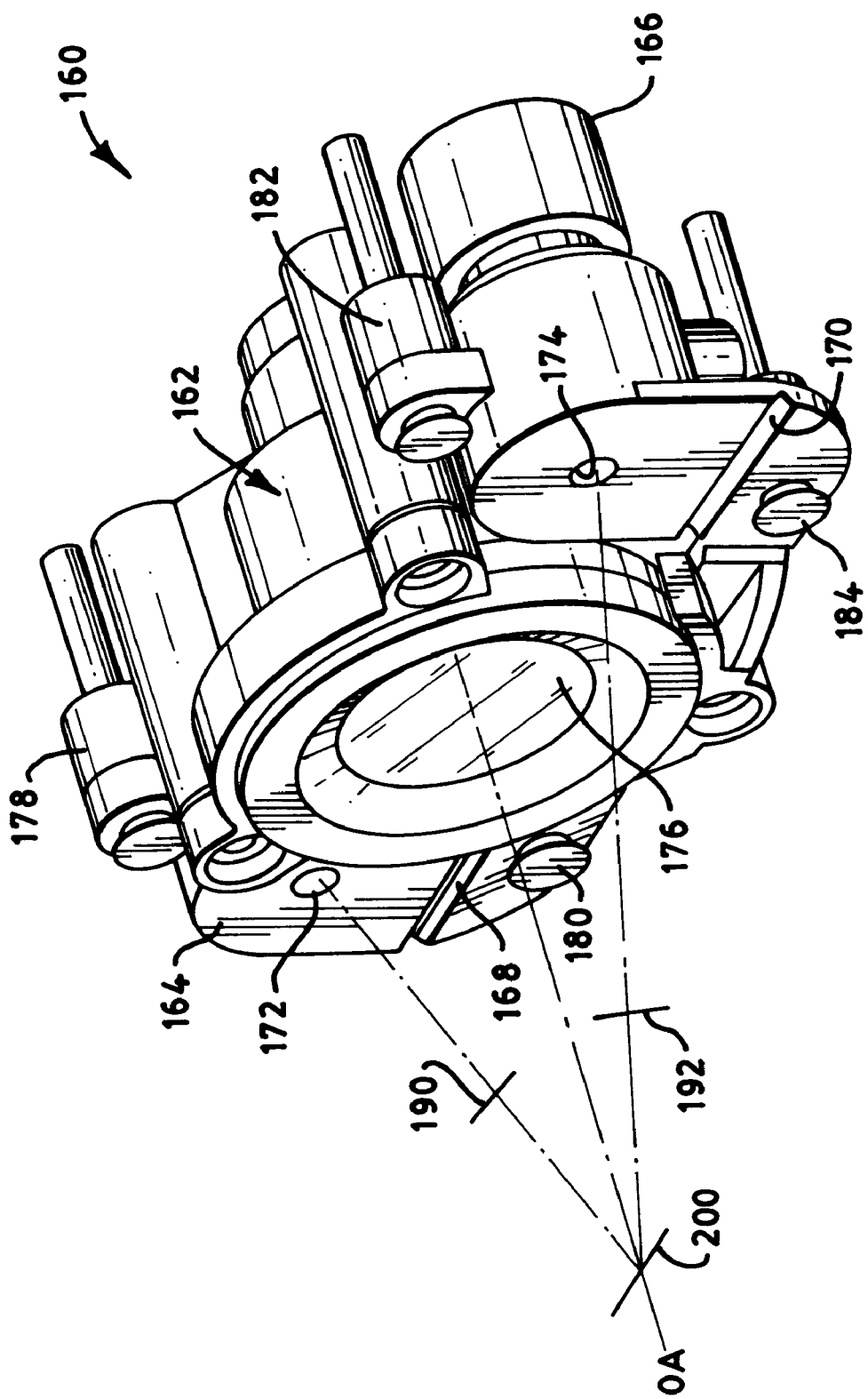
FIG. 20 is a diagrammatic perspective view of an alternative targeting arrangement for use as part of the invention.

Reference is now made to FIG. 20 which shows an alternate to the previously described TTL targeting system. Here, a system 160 comprises a lens barrel 162, similar in some respects to the previously described lens barrel but having a pair of targeting lasers which reside in housings 164 and 166 that are arranged on either side of lens barrel 162. Targeting laser housings 164 and 166 are pivotally mounted to lens barrel 162 via living hinges 168 and 170, respectively. Each housing includes a source and associated optical means for projecting a line image of its respective source as indicated at 190 and 192. Adjusters 178, 180, 182, and 184 change the pitch and yaw of lens housings 164 and 166 with respect to lens barrel 162 to permit the projected images to be aligned with respect to one another at a cross-over point 200 along the optical axis, $O_A$ of lens 176. This targeting is suitable for use where parallax issues are minimal.

Referring now to FIG. 21, there is shown an alternate form of rotating disk for focusing objective taking lens 92. Here, a disk assembly 210 comprises a rotating disk 212 that operates in conjunction with a fixed element 214 to continuously vary the optical properties of the imaging system to achieve focus as disk 212 rotates. For this purpose, disk 212 is provided with a "quintic" surface 216 that operates with another "quintic" surface (i.e., a surface in the form of an analytic function represented mathematically as a polynomial in x and y containing 5th order terms) to simulate the optical action of a continuum of equivalent spherical lenses of different dioptric power which add or subtract, as the case may be, to the basic power of the objective taking lens 92, as needed. As described more fully in U.S. Pat. No. 4,650,292 issued to James G. Baker, et al. on Mar. 17, 1987 and incorporated herein in its entirety by reference, the optical action of analytic function surfaces need not reside in a single rotating disk and a single fixed element, but rather, may be present, for example, in two or more rotating disks, either by themselves, or in combination with fixed elements. Disk 212 may be provided with an encoding strip as previously described for establishing its angular rotational position. Also, as shown, disk 212 rotates about an axis that is displaced from and parallel to the optical axis, $O_A$.

Figure 22:
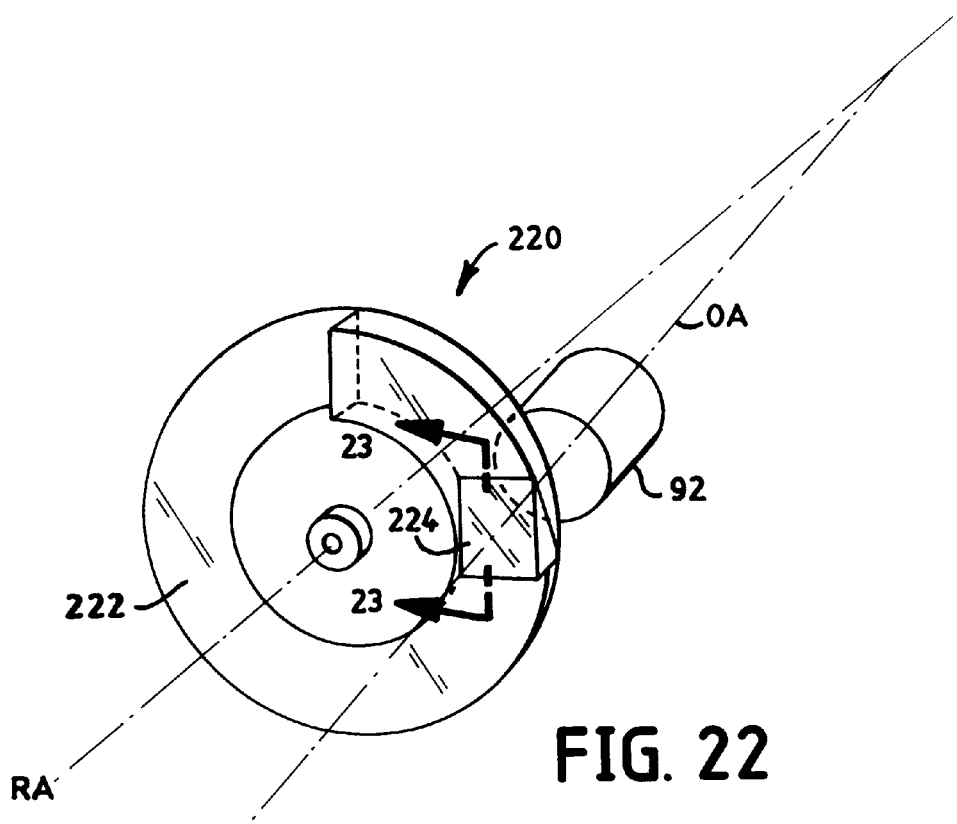
FIG. 22 is a diagrammatic perspective view of a rotating disk that carries a generally continuous helical surface that may be used to focus the objective taking lens of the invention.
Figure 23:
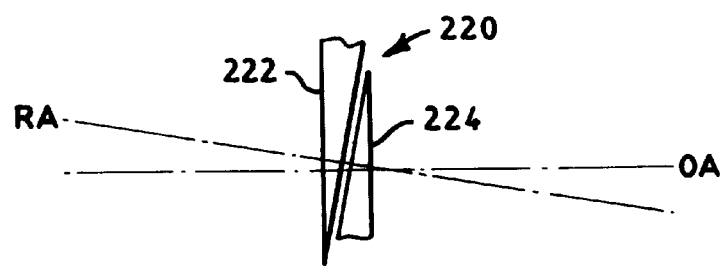
FIG. 23 is a diagrammatic sectional view of the of the embodiment shown in FIG. 22 taken generally along line 23—23 thereof.
Figure 24:
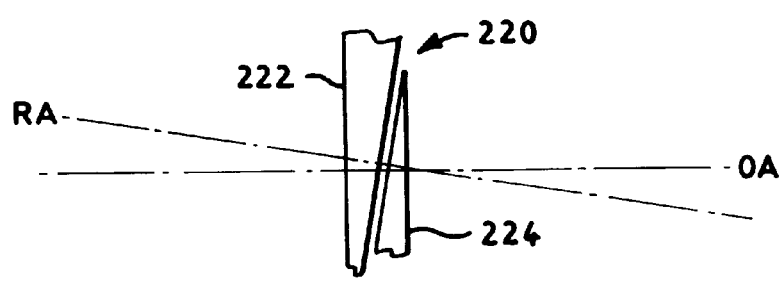
FIG. 24 is a diagrammatic sectional view of the of the embodiment shown in FIG. 22 taken generally along line 23—23 thereof, except with the helical surface in a different rotational position.

Reference is now made to FIG. 22 which shows yet another form of rotational disk that may be used to practice the invention. Here, a rotating disk 220 is provided with a helical surface that operates in conjunction with a fixed wedge element 224 to provide a continuum of varying thickness "optical shims". The helical angle is established by the required thickness, taking into account the effect of fixed wedge 224, and the nominal circumferential length of disk 220. As shown in FIGS. 23 and 24, the combination of the disk 220 (at different angular positions) with fixed wedge 224 provides the equivalent of optical shims of different thickness; the equivalent thickness in FIG. 23 being less than that of FIG. 24. Also, notice that the air space between disk 220 and fixed wedge element 224 remains constant with rotational angle of disk 220. This is brought about by fabricating disk 220 with a plano surface that faces the hypotenuse of fixed wedge element 224 while having the axis of rotation axis, $R_A$, of disk 220 offset and arranged at an angle with respect to optical axis $O_A$. Again, the angular position of disk 220 may be determined with a positional encoder scheme as previously described.

Having described the invention with reference to the embodiments above, it will be apparent to those skilled in the art that other variations are possible in accordance with the teachings of the invention. It is therefore intended that the description above not be interpreted in a limiting sense.

TABLE I

Prescription Data

| | |
|---|---|
| Title: | HHS. EFL=14 mm f/5.6 |
| GENERAL LENS DATA: | |
| Surfaces: | 20 |
| Stop: | 11 |
| System Aperture: | Float By Stop Size |
| Ray aiming: | On |
| X Pupil shift: | 0 |
| Y Pupil shift: | 0 |
| Z Pupil shift: | 0 |
| Apodization: | Uniform, factor = 0.000000 |
| Eff. Focal Len.: | 14.0016 (in air) |
| Eff. Focal Len.: | 14.0016 (in image space) |
| Total Track: | 53.339 |
| Image Space F/#: | 5.44947 |
| Para. Wrkng F/#: | 6.70976 |
| Working F/#: | 6.70544 |
| Obj. Space N.A.: | 0.0160957 |
| Stop Radius: | 1.2 |
| Parax. Ima. Hgt.: | 3 |
| Parax. Mag.: | −0.216025 |
| Entr. Pup. Dia.: | 2.56934 |
| Entr. Pup. Pos.: | 37.804 |
| Exit Pupil Dia.: | 2.4 |
| Exit Pupil Pos.: | −16.0496 |
| Field Type: | Image height in Millimeters |
| Maximum Field: | 3 |

TABLE I-continued

Prescription Data

| | | | |
|---|---|---|---|
| Primary Wave: | 0.546000 | | |
| Lens Units: | Millimeters | | |
| Angular Mag.: | 1.07056 | | |
| Fields: | 3 | | |
| Field Type: | Image height in Millimeters | | |
| # | X-Value | Y-Value | Weight |
| 1 | 0.000000 | 0.000000 | 1.000000 |
| 2 | 0.000000 | 2.100000 | 1.000000 |
| 3 | 0.000000 | 3.000000 | 1.000000 |

Vignetting Factors

| # | VDX | VDY | VCX | VCY |
|---|---|---|---|---|
| 1 | 0.000000 | 0.000000 | 0.000000 | 0.000000 |
| 2 | 0.000000 | 0.000000 | 0.000000 | 0.000000 |
| 3 | 0.000000 | 0.000000 | 0.000000 | 0.000000 |
| 4 | 0.000000 | 0.000000 | 0.000000 | 0.000000 |

| | | |
|---|---|---|
| Wavelengths: | 3 | |
| Units: | Microns | |
| # | Value | Weight |
| 1 | 0.546000 | 1.000000 |
| 2 | 0.486130 | 1.000000 |
| 3 | 0.656270 | 1.000000 |

SURFACE DATA SUMMARY:

| Surf | Type | Radius | Thickness | Glass | Diameter | Conic |
|---|---|---|---|---|---|---|
| 1 | STANDARD | Infinity | 42 | | 27.77456 | 0 |
| 2 | STANDARD | Infinity | 1.524 | POLY-CARB | 18.7 | 0 |
| 3 | STANDARD | −79.8 | 2.2 | POLY-CARB | 11.84 | 0 |
| 4 | EVENASPH | −14.42 | 8.28 | | 11.6 | 0 |
| 5 | STANDARD | −8.98 | 2 | POLY-CARB | 4.24 | 0 |
| 6 | STANDARD | 3.67 | 0.355 | | 3.5 | 0 |
| 7 | STANDARD | 6.8 | 2.2 | ACRYLIC | 3.52 | 0 |
| 8 | STANDARD | −10.06 | 0.85 | | 3.44 | 0 |
| 9 | STANDARD | −117 | 1.8 | ACRYLIC | 3.2 | 0 |
| 10 | STANDARD | −4.5 | 0.6 | | 2.94 | 0 |
| STO | STANDARD | Infinity | 0.45 | | 2.4 | 0 |
| 12 | STANDARD | Infinity | 1.524 | POLY-CARB | 4 | 0 |
| 13 | STANDARD | Infinity | 0 | POLY-CARB | 4 | 0 |
| 14 | STANDARD | Infinity | 11.856 | | 4 | 0 |
| 15 | STANDARD | Infinity | 1 | BK7 | 5.4 | 0 |
| 16 | STANDARD | Infinity | 0.5 | | 5.6 | 0 |
| 17 | STANDARD | Infinity | 0.8 | BK7 | 5.8 | 0 |
| 18 | STANDARD | Infinity | 1.1 | | 5.8 | 0 |
| 19 | STANDARD | Infinity | 0 | | 6 | 0 |
| IMA | STANDARD | Infinity | 0 | | 6 | 0 |

SURFACE DATA DETAIL:

| | |
|---|---|
| Surface OBJ: | STANDARD |
| Surface 1: | STANDARD |
| Aperture: | Circular Aperture |
| Minimum Radius: | 0 |
| Maximum Radius: | 9.35 |
| Surface 2: | STANDARD |
| Aperture: | Circular Aperture |
| Minimum Radius: | 0 |
| Maximum Radius: | 9.16 |
| Surface 3: | STANDARD |
| Aperture: | Circular Aperture |
| Minimum Radius: | 0 |
| Maximum Radius: | 5.92 |
| Surface 4: | EVENASPH |
| Coeff on r 2: | 0 |
| Coeff on r 4: | 0.0001602096 |
| Coeff on r 6: | −8.809186e−007 |
| Coeff on r 8: | 6.144941e−009 |
| Coeff on r 10: | 0 |
| Coeff on r 12: | 0 |
| Coeff on r 14: | 0 |
| Coeff on r 16: | 0 |
| Aperture: | Circular Aperture |
| Minimum Radius: | 0 |
| Maximum Radius: | 5.8 |
| Surface 5: | STANDARD |
| Aperture: | Circular Aperture |
| Minimum Radius: | 0 |
| Maximum Radius: | 2.12 |
| Surface 6: | STANDARD |
| Aperture: | Circular Aperture |
| Minimum Radius: | 0 |
| Maximum Radius: | 1.75 |
| Surface 7: | STANDARD |
| Aperture: | Circular Aperture |
| Minimum Radius: | 0 |
| Maximum Radius: | 1.76 |
| Surface 8: | STANDARD |
| Aperture: | Circular Aperture |
| Minimum Radius: | 0 |
| Maximum Radius: | 1.72 |
| Surface 9: | STANDARD |
| Aperture: | Circular Aperture |
| Minimum Radius: | 0 |
| Maximum Radius: | 1.6 |
| Surface 10: | STANDARD |
| Aperture: | Circular Aperture |
| Minimum Radius: | 0 |
| Maximum Radius: | 1.47 |
| Surface STO: | STANDARD |
| Surface 12: | STANDARD |
| Aperture: | Circular Aperture |
| Minimum Radius: | 0 |
| Maximum Radius: | 2 |
| Surface 13: | STANDARD |
| Aperture: | Circular Aperture |
| Minimum Radius: | 0 |
| Maximum Radius: | 2 |
| Surface 14: | STANDARD |
| Aperture: | Circular Aperture |
| Minimum Radius: | 0 |
| Maximum Radius: | 2 |
| Surface 15: | STANDARD |
| Aperture: | Circular Aperture |
| Minimum Radius: | 0 |
| Maximum Radius: | 2.7 |
| Surface 16: | STANDARD |
| Aperture: | Circular Aperture |
| Minimum Radius: | 0 |
| Maximum Radius: | 2.8 |
| Surface 17: | STANDARD |
| Aperture: | Circular Aperture |
| Minimum Radius: | 0 |
| Maximum Radius: | 2.9 |
| Surface 18: | STANDARD |
| Aperture: | Circular Aperture |
| Minimum Radius: | 0 |
| Maximum Radius: | 2.9 |
| Surface 19: | STANDARD |
| Aperture: | Circular Aperture |
| Minimum Radius: | 0 |
| Maximum Radius: | 3 |
| Surface IMA: | STANDARD |
| Aperture: | Circular Aperture |
| Minimum Radius: | 0 |
| Maximum Radius: | 3 |

TABLE II

Focal Zones

| Zone Number | Plate Thickness (mm of Polycarbonate) | Zone Start (mm from front of window) | Zone End (mm from front of window) |
|---|---|---|---|
| 1 | 0 | 40.2 | 45.5 |
| 2 | 0.65 | 45.5 | 51.8 |
| 3 | 1.30 | 51.8 | 59.2 |

TABLE II-continued

Focal Zones

| Zone Number | Plate Thickness (mm of Polycarbonate) | Zone Start (mm from front of window) | Zone End (mm from front of window) |
|---|---|---|---|
| 4 | 1.92 | 59.2 | 67.9 |
| 5 | 2.53 | 67.9 | 78.5 |
| 6 | 3.13 | 78.5 | 91.5 |
| 7 | 3.72 | 91.5 | 108.0 |
| 8 | 4.29 | 108.0 | 129.5 |
| 9 | 4.85 | 129.5 | 159.0 |
| 10 | 5.40 | 159.0 | 201.0 |
| 11 | 5.94 | 201.0 | 268.0 |
| 12 | 6.48 | 268.0 | 390 |

What is claimed is:

1. A hand held symbology reader comprising:
a portable housing configured to be held by a user such that the user can manipulate the reader for purposes of aiming it at a symbology to be read;
a two-dimensional photodetector having an active area positioned in said housing at a predetermined location; and
an objective taking lens positioned with respect to said two-dimensional photodetector to image symbologies on said active area thereof, said objective taking lens including a plurality of stationary lens elements fixedly aligned along an optical axis and at least one focusing element that is rotatable about an axis offset with respect to said optical axis, said focusing element being moveable transversely with respect to said optical axis to change the focus of said objective taking lens between at least two focusing zones so that said objective taking lens can image both linear and matrix symbologies over working distances that at least partially overlap with respect to linear and matrix symbologies.

2. The hand held symbology reader of claim 1 wherein said objective taking lens is structured so that said hand held symbology reader can be tilted through 30° with respect to the normal.

3. The hand held symbology reader of claim 1 having an overall working distance ranging substantially between 1.5 and 16 inches.

4. The hand held symbology reader of claim 1 wherein said objective taking lens comprises four elements of form plus, plus, minus, plus.

5. The hand held symbology reader of claim 4 wherein the first two elements of said objective taking lens are polycarbonate and the last two of acrylic.

6. The hand held symbology reader of claim 1 wherein said focusing element comprises a plurality of focusing shims of different thickness to change the optical path length of said objective taking lens so that symbologies positioned at different locations within the field of view of said hand held symbology reader will be acceptably imaged on said active area of said two-dimensional photodetector.

7. The hand held symbology reader of claim 1 wherein said focusing element comprises a rotating disk in combination with at least one fixed element, the combination being structured to vary the optical properties of said objective taking lens so that symbologies positioned at different locations within the field of view of said hand held symbology reader will be acceptably imaged on said active area of said two-dimensional photodetector.

8. The hand held symbology reader of claim 7 wherein at least one said fixed element is positioned along the optical axis of said objective taking lens so that it is in alignment with the periphery of said rotating disk on at least one side thereof.

9. The hand held symbology reader of claim 7 wherein said rotating disk of said combination has at least one surface having a shape in the form of an analytic function describable as a polynomial of at least $5^{th}$ order.

10. The hand held symbology reader of claim 1 wherein said focusing element comprises a rotating disk in combination with a fixed prismatic element, the combination being structured to provide a continuum of varying thickness along the optical axis of said objective taking lens.

11. The hand held symbology reader of claim 1 wherein said focusing element comprises a unitary disk having surface structure to provide for changing the focus of said objective taking lens between at least two focusing zones so that said objective taking lens can image both linear and matrix symbologies over said working distances.

12. The hand held symbology reader of claim 11 wherein said surface structure comprises a continuum about said periphery.

13. The hand held symbology reader of claim 1 further including artificial illumination means for providing supplemental illumination on a bar code when ambient light levels are too low for acceptable imaging.

14. The hand held symbology reader of claim 13 wherein said illumination means is operative to provide diffuse illumination for nearby matrix symbologies and partially diffuse for both distant linear and matrix symbologies.

15. The hand held symbology reader of claim 14 further including includes means for detecting low light levels and turning on said supplemental illumination means.

16. The hand held symbology reader of claim 1 further including ranging means for determining the distance of bar code and providing a signal to set the focus of a focusing zone.

17. The hand held symbology reader of claim 1 further including targeting means for establishing positioning said hand held symbology reader with respect to a bar code to be read so that the bar code will be within field of view of and focusing range of said hand held symbology reader.

18. The hand held symbology reader of claim 17 wherein said targeting means comprises a through the lens system for projecting a line of light along the optical axis where the line of light is of such a size that, when visually placed over a symbology by a user, the symbology is assured of being within the focusing ability and field of view of said hand held symbology reader.

19. The hand held symbology reader of claim 1 wherein said objective taking lens has an on-axis modulation transfer function having a contrast of at least twenty percent at 66 line pairs in image space.

20. A method for forming an image of a symbology, said method comprising the steps of:
aiming an objective taking lens and a two-dimensional photodetector having an active area positioned behind said objective taking lens by a predetermined distance at the symbology so that the symbology is located with the field of view of the objective taking lens and the two-dimensional photodetector;
continuously rotating a focusing element such that focusing element moves transversely with respect to said optical axis of the objective taking lens to continuously change the focus of said objective taking lens between at least two focusing zones so that said objective taking lens can image both linear and matrix symbologies over working distances that at least partially overlap with respect to linear and matrix symbologies;

forming a series of images of the symbology via the objective taking lens onto the two-dimensional photodetector as the focusing element rotates;

determining the range separating the objective taking lens and the symbology;

determining a best focusing zone of the focusing element that most sharply images the symbology in accordance with the range determined as the focusing element rotates;

capturing an image of the symbology with the two-dimensional photodetector when the best focusing zone of the rotating focusing element is in alignment with the objective taking lens.

21. The method of claim 20 wherein the step of aiming the objective taking lens and two-dimensional photodetector at the symbology comprises projecting a line image of a light source through the objective taking lens substantially along the optical axis thereof to provide a visual indication to permit the line image to be placed over the symbology such that it is within the field of view of the objective taking lens and two-dimensional photodetector.

22. The method of claim 20 wherein said focusing element is selected from the group consisting of disks comprising optical shims, helical surfaces, and analytic function elements.

23. The method of claim 20 further including the step of determining the level of available illumination and providing an artificial source of illumination that is diffuse where symbologies are near and partially diffuse where distant with respect to the objective taking lens.

* * * * *